United States Patent
Thornton et al.

(10) Patent No.: US 9,189,687 B2
(45) Date of Patent: *Nov. 17, 2015

(54) ASSISTED VIDEO SURVEILLANCE OF PERSONS-OF-INTEREST

(71) Applicant: Massachusetts Institute of Technology, Cambridge, MA (US)

(72) Inventors: Jason R. Thornton, Chelmsford, MA (US); Daniel J. Butler, Rochester, NY (US); Jeanette T. Baran-Gale, Durham, NC (US)

(73) Assignee: Massachusetts Institute of Technology, Cambridge, MA (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/745,502

(22) Filed: Jan. 18, 2013

(65) Prior Publication Data

US 2013/0201330 A1    Aug. 8, 2013

Related U.S. Application Data

(63) Continuation of application No. 13/677,183, filed on Nov. 14, 2012.

(60) Provisional application No. 61/559,539, filed on Nov. 14, 2011.

(51) Int. Cl.
*H04N 7/18* (2006.01)
*G06K 9/00* (2006.01)
*G06K 9/32* (2006.01)

(52) U.S. Cl.
CPC ........ *G06K 9/00771* (2013.01); *G06K 9/00805* (2013.01); *G06K 9/3241* (2013.01); *H04N 7/18* (2013.01)

(58) Field of Classification Search
USPC ................ 348/143, 142, 153, 87, 77, 61, 47, 348/211.14, 222.1, 376, 412.1, 415.1, 553, 348/564, 569, 575, 714, 719, 725, 739; 715/700, 727, 728, 762, 763; 725/37, 725/53, 55, 93, 153; 382/103, 118, 209; 345/475, 594, 598, 599, 650
See application file for complete search history.

(56) References Cited

U.S. PATENT DOCUMENTS

| | | | |
|---|---|---|---|
| 6,188,777 B1 | 2/2001 | Darrell et al. | |
| 6,252,985 B1 * | 6/2001 | Mitsunaga et al. | 382/199 |
| 6,640,002 B1 * | 10/2003 | Kawada | 382/141 |
| 7,596,475 B2 * | 9/2009 | Thiesson et al. | 703/2 |
| 7,987,111 B1 | 7/2011 | Sharma et al. | |
| 8,515,987 B1 * | 8/2013 | Jain et al. | 707/769 |
| 8,537,212 B2 * | 9/2013 | Kunihiro et al. | 348/77 |
| 8,908,928 B1 * | 12/2014 | Hansen | 382/111 |

(Continued)

*Primary Examiner* — Jefferey Harold
*Assistant Examiner* — Mustafizur Rahman
(74) *Attorney, Agent, or Firm* — McCarter & English, LLP; David R. Burns

(57) ABSTRACT

Methods, systems and media are described for computer-assisted video surveillance. Methods may support detection of moving persons in video frames, extraction of features of the detected moving persons and identification of which detected moving persons are likely matches to a person of interest. Identification of the likely matches may be determined using an attribute-based search, and/or using a specific person-based search. The method may include using likely matches confirmed as images of the person of interest to reconstruct a path of the person of interest.

23 Claims, 14 Drawing Sheets
(2 of 14 Drawing Sheet(s) Filed in Color)

(56) References Cited

U.S. PATENT DOCUMENTS

| | | |
|---|---|---|
| 2006/0018516 A1 | 1/2006 | Masoud et al. |
| 2006/0187305 A1 | 8/2006 | Trivedi et al. |
| 2006/0291696 A1 | 12/2006 | Shao et al. |
| 2007/0003141 A1 | 1/2007 | Rittscher et al. |
| 2008/0247650 A1* | 10/2008 | Amir et al. .................. 382/209 |
| 2009/0021602 A1* | 1/2009 | Fujiwara et al. ........... 348/223.1 |
| 2009/0153654 A1* | 6/2009 | Enge et al. ...................... 348/61 |
| 2009/0189994 A1* | 7/2009 | Shimonaka ................ 348/222.1 |
| 2009/0189995 A1* | 7/2009 | Shimazaki et al. ........ 348/222.1 |
| 2010/0169376 A1* | 7/2010 | Chu .............................. 707/780 |
| 2010/0322474 A1 | 12/2010 | Cheriyadat et al. |
| 2011/0026770 A1 | 2/2011 | Brookshire |
| 2011/0182484 A1* | 7/2011 | Jeon et al. .................... 382/118 |

* cited by examiner

ASSISTED VIDEO SURVEILLANCE OF PERSONS-OF-INTEREST

RELATED APPLICATIONS

The present application is a continuation of, and claims priority to, U.S. patent application Ser. No. 13/677,183, filed Nov. 14, 2012, which claims priority to and benefit of U.S. Provisional Patent Application No. 61/559,539, filed Nov. 14, 2011, each of which is herein incorporated by reference in its entirety. The present application is also related to U.S. patent application Ser. No. 13/745,401, filed Jan. 18, 2013.

STATEMENT OF GOVERNMENT INTEREST

This invention was made with government support under Grant No. FA8721-05-C-0002 awarded by the U.S. Air Force. The government has certain rights in this invention.

BACKGROUND

Driven by recent advances in digital video camera design, video management systems, and efficient archiving, security at large publicly accessible facilities and urban sites increasingly deploys comprehensive video surveillance systems. Such systems support both the ability to monitor wide areas in real time and the ability to conduct forensic reviews after an incident or a tip. Most analysis of surveillance video for security purposes requires a user or users (e.g., operators or investigators) to search for particular types of video content (e.g., specific actions or behaviors, or vehicles, objects, or persons fitting a given description). While the fully attentive human visual system is very adept at interpreting video content, it is also typically limited in capacity to reviewing one camera view at a time at speeds near real-time, depending on the level of activity in the scene. As a result, searching over large amounts of surveillance video can be a slow and cumbersome process. In addition, the human attention span does not persist at full capacity over long time periods. This is the motivation for automated video search technology, which can direct the attention of security personnel or investigators to potentially useful video content.

Research into video-based automated searching for persons often focuses on biometric recognition using signatures that can be captured at a distance, such as gait or especially face. There have been several recent attempts to incorporate appearance descriptions of persons into video search techniques, including so-called "soft biometrics." Some techniques localize persons and frontal faces in video using standard Haar feature cascade classifiers, and focus primarily on the characterization of facial attributes for images captured at relatively close range to the camera (e.g., detection of facial hair and glasses, or classification of gender and ethnicity based on facial features).

However, face recognition systems can only be employed when surveillance cameras capture face images at sufficient resolution and illumination. In fact, experimental studies indicate that face recognition performance begins to degrade at (compressed) image resolutions as high as 90 pixels between the eyes, which is much greater resolution than typically provided by surveillance video, unless cameras are setup with narrow fields of view (e.g., monitoring specific doorways at close range). For video cameras covering large areas and at a distance from subjects (on the order of tens of meters), analysis of faces may be unreliable. Further, biometric recognition often requires a database of prior enrollment records against which to perform identification, which would not necessarily be available when security personnel or investigators are working with an eyewitness description of a person of interest. In addition, traditional tracking systems attempt to estimate a person's position frame-by-frame, making these systems susceptible to failure in crowded environments due to the many sources of occlusion and clutter (e.g., nearby people in a crowd).

SUMMARY

Example embodiments described herein include, but are not limited to, computer-implemented methods for analyzing surveillance video data, and systems for video surveillance. Some embodiments include reconstructing a path of the person of interest. Some embodiments include identifying one or more candidate images for a person of interest based on a provided attribute profile. Some embodiments include receiving an image of a person of interest and creating a person-specific detector.

One embodiment is a computer-implemented method for analyzing surveillance video data that includes receiving information regarding a person of interest, detecting a first moving person in a first frame of the video data, and creating a first record including image data from a subsection of the first frame associated with the first moving person. The method further includes detecting a second moving person in a second frame of the video data, and creating a second record including image data from a subsection of the second frame associated with the second moving person. The method also includes identifying the first record and the second record as candidate matches to the person of interest based on features of the first record, features of the second record and information received regarding the person of interest, and reconstructing the path of the person of interest based on spatial and temporal information regarding the first record and the second record.

In some embodiments, the method also includes displaying the first record and the second record to a user as candidate matches to the person of interest. In some embodiments, the method also includes receiving a confirmation from the user that the first record and the second record include image data for the person of interest.

In some embodiments, the method further includes displaying the reconstructed path to a user.

In some embodiments in which the information received regarding the person of interest is an attribute profile, identifying the first record and the second record as candidate matches to the person of interest includes calculating values for a plurality of attributes characterizing each detected moving person by employing a probabilistic model that matches attributes to image data in the record associated with the detected moving person to obtain values for the plurality of attributes associated with each record. Identifying the first record and the second record as candidate matches to the person of interest also includes calculating a score for each record based on a comparison of the received attribute profile with the calculated values for the plurality of attributes for the record. In some embodiments, the attribute profile includes attributes regarding non-head portions of a person.

In some embodiments, the method also includes creating a composite video including a plurality of video segments with images of the person of interest. The plurality of video segments may be obtained from a plurality of cameras. In some embodiments, the composite video is based on the reconstructed path.

In some embodiments in which the information received regarding the person of interest is an identification of the person of interest in an image, identifying the first record and the second record as candidate matches to the person of interest includes detecting a moving person in a frame of comparison video data for each frame in a plurality of frames of comparison video data. Identifying the first record and the second record as candidate matches to the person of interest also includes creating a record including image data from a subsection of the frame associated with the detected moving person for each of the plurality of frames of comparison video data. Identifying the first record and the second record as candidate matches to the person of interest further includes creating a person-specific detector for the person of interest by training a support vector machine classifier using image data of the person of interest as positive training data and the records of the detected moving persons in the comparison video data as negative training data, and applying the person-specific detector to records from video data of interest to identify the first record and the second record as candidate matches to the person of interest.

In some embodiments, the video data is obtained from a plurality of imaging devices.

One embodiment is a computer-implemented method for analyzing surveillance video data that includes detecting one or more moving persons in a frame for each frame in a plurality of frames of the video data and creating a record including image data from a subsection of the frame associated with the detected moving person for each detected moving person and for each frame. The method also includes calculating values for a plurality of attributes characterizing each detected moving person by employing a probabilistic model that matches attributes to image data in the record associated with the detected moving person, and receiving an attribute profile including a value for at least one attribute of a person, wherein the plurality of attributes includes the at least one attribute. The method further includes calculating a score for each record based on a comparison of the received attribute profile with the calculated values for the plurality of attributes for the record, and identifying one or more records as candidate matches to the person of interest based on the calculated scores.

In some embodiments, the plurality of attributes includes attributes regarding non-head portions of a person. In some embodiments, the plurality of attributes includes a full body attribute of a person.

In some embodiments, the method further includes displaying the one or more candidate match records to a user, and receiving a selection of at least one of the one or more candidate match records as a match to the person of interest. In some embodiments, the method may further include estimating a spatial path between the selected match records based on time information and on location information associated with each of the selected match records. The method may also include storing the estimated spatial path and the selected match records.

In some embodiments, the method also includes creating a composite video including a plurality of video segments with images of the person of interest. In some embodiments, the plurality of video segments are obtained from a plurality of cameras. The composite video may be based on the estimated spatial path.

In some embodiments, the method further includes detecting one or more moving persons in a frame of comparison video data for a plurality of frames of comparison video data that do not include an image of the person of interest, and creating a record including image data from a subsection of the frame associated with the detected moving person for each of the detected moving persons. The method may further include creating a person-specific detector for the person of interest by training a support vector machine classifier using the selected at least one match record as positive training data and the records of the detected moving persons in the comparison video data as negative training data.

One embodiment is a computer-implemented method for analyzing video data including a plurality of people that includes receiving an identification of a person of interest in an image, and detecting one or more moving persons in a frame for each frame in a plurality of frames of comparison video data that does not include an image of the person of interest. The method further includes creating a record including image data from a subsection of the frame associated with the detected moving person for each of the detected moving persons and for each of the plurality of frames of comparison video data, and creating a person-specific detector for the person of interest by training a support vector machine classifier using at least one image of the person of interest as positive training data and the records of the detected moving persons in plurality of frames of comparison video data as negative training data. The method also includes applying the person-specific detector to a plurality of records from video data of interest to identify one or more records as candidate matches to the person of interest.

In some embodiments, the method may also include detecting one or more moving persons in a frame for each in a plurality of frames of the video data of interest, and creating a record including image data from a subsection of the frame associated with the detected moving person for each detected moving person in the plurality of frames of the video of interest.

In some embodiments, receiving an identification of a person of interest in an image includes receiving an identification of one or more records in one or more frames of the video of interest.

In some embodiments, the support vector machine classifier compares information regarding full-body or nearly full-body images to obtain the person-specific detector. In some embodiments, the person-specific detector incorporates information about non-facial features of a person.

In some embodiments, the method also includes displaying the one or more one or more candidate match records to a user, and receiving a selection of at least one of the one or more candidate match records from the user. The method may also include estimating a spatial path between the selected candidate match records based on time information and on location information associated with each of the selected candidate match records. The method may further include storing the estimated spatial path and the selected candidate match records. The method may include creating a composite video including a plurality of video segments with images of the person of interest. The plurality of video segments may be obtained from a plurality of cameras. The composite video may be based on the reconstructed path.

Other embodiments include a non-transitory computer-readable medium encoded with computer executable instructions for performing surveillance according to any of the methods described herein.

Other embodiments include a system for video surveillance. One embodiment of a system includes a storage for storing records including images of detected moving persons in video data and for storing features extracted from the records, a graphical user interface for receiving search criteria from a user and displaying search results to a user, and a processor for executing any of the methods described or claimed herein.

Another embodiment includes a system for video surveillance. The system includes a graphical user interface for receiving search criteria from a user and displaying search results to a user, a processor for executing computer-executable instructions. The system also includes a storage for storing records including images of detected moving persons in video data, for storing features extracted from the records and for storing computer-executable code. The computer-executable code includes computer-executable instructions for a module that detects one or moving persons in a plurality of frames of input video data and saves a record including image information for each detected moving person in each frame. The computer-executable code also includes computer-executable instructions for a module that extracts features for each record, in which the features include features of a non-head portion of a person. The computer-executable code also includes computer-executable instructions for a module that receives a user input regarding a person of interest and calculates a match score for record based on a comparison of the user input regarding the person of interest and the extracted features for the record.

In some embodiments, the computer-executable instructions also include instructions for a module for video retrieval and path reconstruction that reconstructs a path of the person of interest based on a user's selection of two or more records as records of the person of interest.

In some embodiments, the module that calculates a match score includes an attribute-based search module that calculates values for a plurality of attributes characterizing each detected moving person by employing a probabilistic model that matches attributes to image data in the record associated with the detected moving person to obtain values for the plurality of attributes associated with each record. The attribute-based search module also calculates an attribute-based match score for each record based on a comparison of the received attribute profile with the calculated values for the plurality of attributes for the record.

In some embodiments, the module that calculates a match score includes an instance-based search module that creates a person-specific detector for the person of interest by training a support vector machine classifier using image data of the person of interest as positive training data and the records of detected moving persons in comparison video data that does not include the person of interest as negative training data, and applies the person-specific detector to records from video data of interest to calculate an instance-based match score.

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
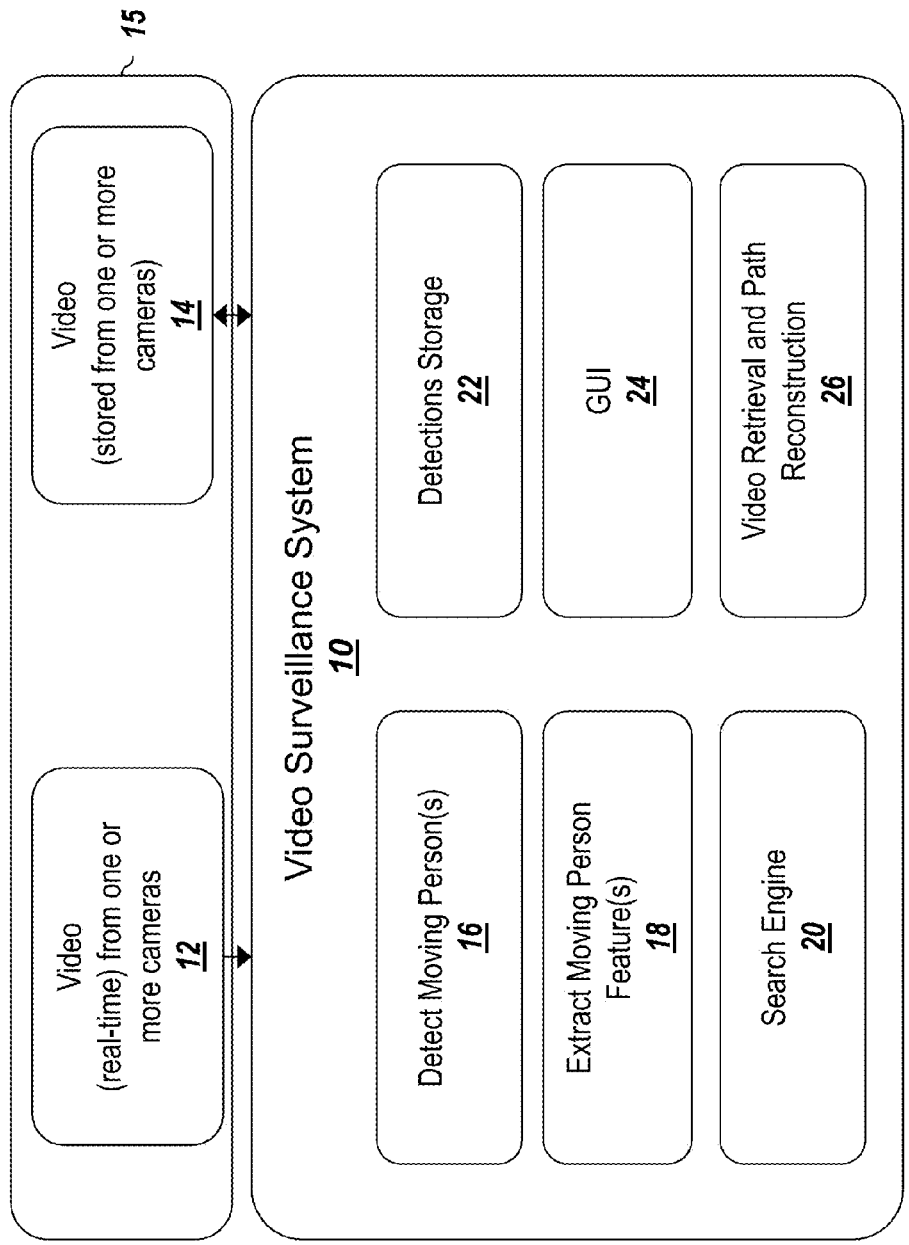
FIG. 1 schematically depicts an exemplary video surveillance system, in accordance with an embodiment.

Additional features, functions and benefits of the disclosed methods, systems and media will be apparent from the description which follows, particularly when read in conjunction with the appended figures.

DETAILED DESCRIPTION

Embodiments include computer-implemented methods and systems for interpreting surveillance images (e.g. video) to display image (e.g., video) content requested by, or of interest to, a user or users (e.g., security personnel). In some embodiments, the methods and systems may be employed for interpreting image data (e.g., video) captured from multiple cameras in large and crowded environments, such as airports or train stations, or more generally, critical infrastructure sites or monitored urban areas. In some embodiments, a method or system enables a user to find and trace the activity of a person or persons-of-interest within high-clutter environments, using either video from a single camera or video collected from multiple distributed cameras and stored at a central repository.

As used herein, video data refers broadly to multiple images acquired by an imaging device over time. As used herein, video data refers to image data captured at any frame rate useful for surveillance (e.g., more than 30 frames per second (fps), 30 fps, 24 fps, 20 fps, 15 fps, 10 fps, 5 fps, 1 fps, less than 1 fps). The frame rate useful for surveillance may depend on the activity being observed, the field of view, the presence or obstructions and other factors.

Exemplary methods and systems may be particularly advantageous for video surveillance of large and crowded areas, in which video data from multiple cameras is aggregated at, or can be accessed from, a central location, and security personnel actively engage in either monitoring of real-time video or in forensic review of archived video. Facilities that fit this description include public transportation facilities (e.g., airports, subway stations, train stations), other critical sites under surveillance (e.g., national monuments, ports, border checkpoints), and large private-domain facilities for which video surveillance is a high priority (e.g., theme parks).

Some embodiments incorporate a system having two main modes of use: an attribute-based search mode that searches based on high-level attribute descriptions, and a person-specific search mode for monitoring individual activity. The attribute-based search mode allows the user to specify a high-level suspect (person of interest) attribute profile (e.g., clothing color, gender, height), along with time and location restrictions, and automatically searches through archived video for examples of individuals who satisfy the specified criteria. Alternatively, the person-specific search mode allows the user to select an image of a person-of-interest and request video samples that trace that person's activity through multiple camera. The system may use the results of the attributed-based search mode or the person-specific search mode to reconstruct a path of the person of interest. Automation of either of these tasks allows them to be performed significantly faster than by manual search through large video sets.

Some embodiments incorporate a computer-implemented method of performing an automatic search for a person or persons who match a basic appearance profile, including clothing, physical attributes (e.g., gender, hair color), and carried objects (e.g., bags or backpacks. Note that some of these attributes are temporary in nature and taken together do not necessarily describe a unique individual in an area under surveillance, but they are observable through video at a distance. The ability to perform automatic searches based on these attributes has the potential to make many monitoring and forensic search tasks much more efficient.

Searching for characteristics observable at a distance may be based on a generative probabilistic model that describes the expected variation in appearance given a particular attribute profile. Some advantages of employing a generative probabilistic model are its ability to successfully recognize many different combinations of attributes (including multi-colored clothing and hand-carried objects) and its flexibility across different poses and body types.

FIG. 1 is a high-level conceptual schematic diagram of a video surveillance system 10, in accordance with some embodiments. System 10 has four main functional modules: a detect moving person(s) module 16 for detection and image extraction of moving persons; a feature extraction module 18 for calculation of features characterizing the image of each detected moving person; a search engine module 20; and a video retrieval and path reconstruction module 26. The search engine module 20 may include a high-level attribute-based search that compares attributes of each moving person to a specified high-level attribute profile, and/or a person-specific search that searches for other instances of a specific person by employing machine-learning techniques. In some embodiments, the person-specific search is incorporated into the video retrieval and path reconstruction module 26. The video retrieval and path reconstruction module 26 may retrieve video segments associated with an identified person of interest and create a composite video from the segments. The video retrieval and path reconstruction 26 model may also reconstruct the path of the identified person of interest based on identified images of the person of interest from analyzed frames of video.

System 10 receives, or has access to, real time video data from one or more cameras 12 and/or stored video data from one or more cameras 14, which is collectively referred to herein as "input video data" 15. Input video data 15 may be in any number of formats known to one of skill in the art. Input video data 15 may be in analog or digital form. If input video data 15 is in analog format, system 10 may include analog to digital conversion components. Input video data 15 may be raw data or may have undergone some processing.

The detect moving person(s) module 10 detects one or more moving person(s) within frames of the input video data 15. The detect moving person(s) module 10 uses a combination of cues to determine the location of moving persons, which may include classifiers based on histograms of oriented gradients, size restrictions based on ground plane projections, and statistical models that discriminate background from foreground. Address information for image data from a portion of a frame that is identified as including a moving person, referred to herein as a detected moving person (DMP) image chip, is saved to detections storage 22 as a record. Based on information in the record, the system can access the DMP image chip within the stored video data. As used herein, the term "image chip" refers to image data for a portion of a frame of video. In some embodiments, detections storage 22 may be external to system 10. In some embodiments, the records may be stored in the same storage as the source of the stored video data 14. In some embodiments, the image chip itself may be stored in the record, instead of, or in addition to, information for locating the image chip in the stored video data.

The feature extraction module 18 computes features that characterize the moving person's image (DMP image chip), based on the spatial arrangement of perceptual colors and edges, and stores these features to a database, such as detections storage 22. In some embodiments, the record may store both address information for the DMP image chip and the calculated features. In other embodiments, a record including address information for the DMP image chip and the associated calculated features for the DMP image chip may be stored separately. In some embodiments, the records may be stored in a different database than the extracted features for corresponding DMP image chips.

As noted above, the search engine module 20 or the system 10 overall may include a high-level attribute search mode and/or a person-specific search mode. In the high-level attribute search mode, a user specifies a high-level attribute profile for a person or persons of interest, and the system automatically searches through archived video for examples of individuals who satisfy the specified criteria. In the high-level search mode, the system searches through features of the stored record of each moving person and scores the record based on its degree of match to a high-level attribute profile. The score is computed by estimating the states of a hierarchical generative model, a type of probabilistic model that describes the way in which the image of a person breaks down into a hierarchy of component parts (e.g., down to pixel level) based on the attribute profile. The model may be structured so that it can perform this estimation and return a match score relatively quickly (e.g., within several milliseconds on a standard processor).

In the person-specific search mode, after a user selects or provides an image of a person of interest, machine learning techniques are employed to select the distinguishing attributes of the person-of interest, and then other views from the same camera and/or other cameras are searched for these same attributes.

The video retrieval and path reconstruction module 26 retrieves and displays video segments corresponding to a user selection of one or more image chips from search results as images of a person of interest via a graphical user interface (GUI) 24. The Video Retrieval and Path Reconstruction module 26 may also reconstruct a path of the person-of interest that has spatial and temporal coherence. The video retrieval and path reconstruction module 26 may enable review or export of composite video depicting the recorded activities of the person of interest across multiple camera views. The GUI 24, which may be in communication with all the other modules, may also be used to initiate searches and view the results of the searches.

As noted above, in some embodiments, the specific-person search mode may be incorporated into the video retrieval and path reconstruction module 26. This would enable the user to select an instance of a person of interest and search for other video samples that trace that person's activity through multiple cameras. As the system updates the path estimate for a particular person of interest when additional video samples for the person are identified, the system may automatically extend the path or fill in gaps in the path.

I. Moving Person Detection

Initially, moving persons are detected within a plurality of frames of at least one video stream using the detect moving person(s) module 16. The detection is directed to finding moving persons because it is less important to store detection information regarding stationary subjects repeatedly to the detection database. In some embodiments, all moving persons are detected within each frame of the input video data. Because a high redundancy of video content may exist from one frame to the next, the detection may initially be performed on a subset of sample frames (e.g., one frame per second). Some additional frames may be analyzed later based on identified time periods of interest, all frames may be later analyzed, or no additional frames may be analyzed if the analysis of the sample frames provides sufficient information. In some embodiments, the detection may occur in real-time (e.g., analyzing one frame per camera per second) and the detections may be stored with time information (e.g., time-stamped) and location information (location-stamped) as records including address information for detected moving person (DMP) image chips in a database.

In some embodiments the detection involves uses a sliding window approach to evaluate candidate detection locations within each sample frame, where a candidate location is specified by the position of a bounding box (x, y) and its dimensions (w, h). Because a fixed aspect ratio is assumed for the bounding box dimensions, there are three parameter values to sweep through during search.

Figure 2:
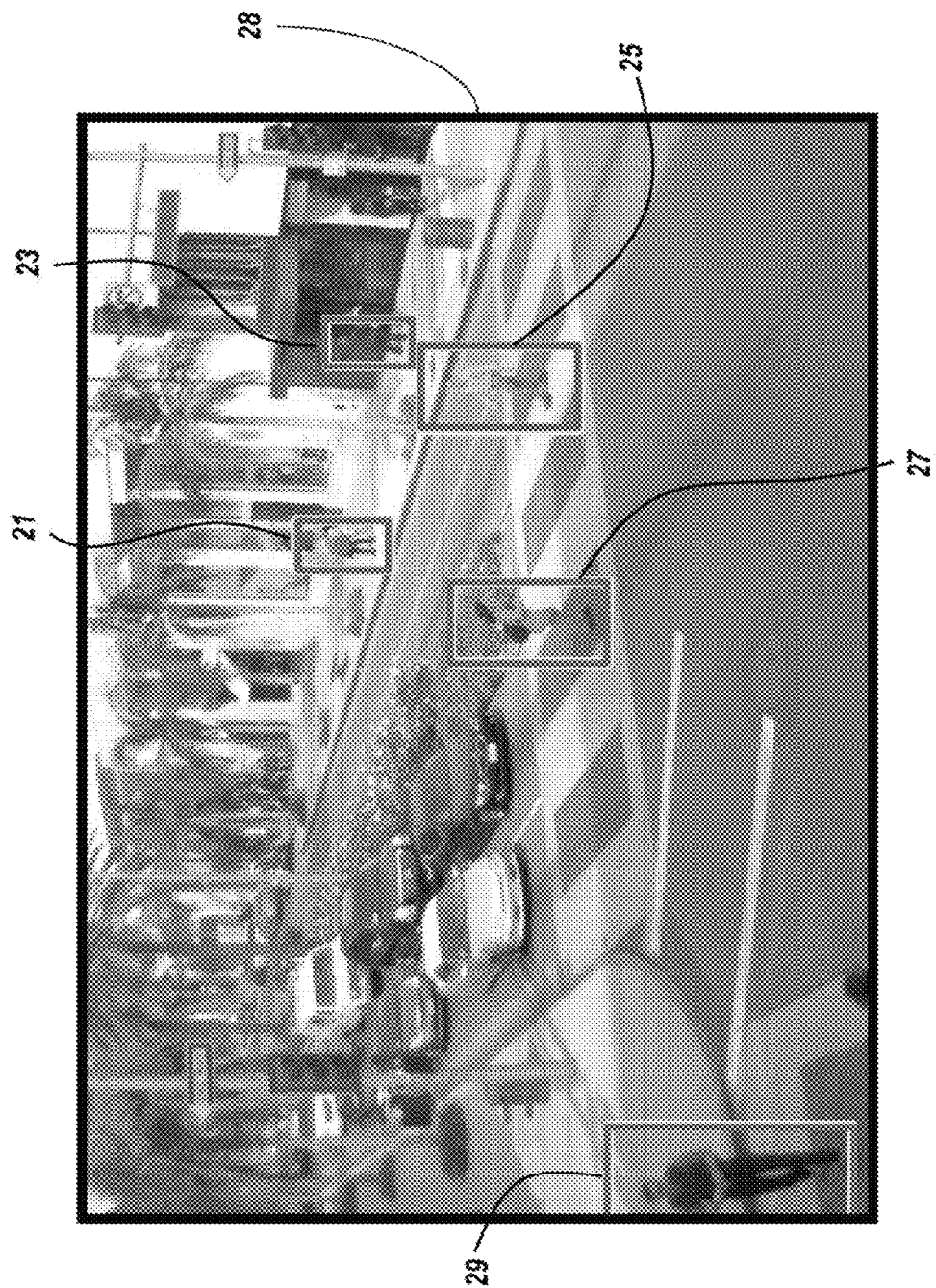
FIG. 2 graphically illustrates the identification of moving persons in a frame of video, in accordance with an embodiment.

In some embodiments, a moving person is detected in a sample frame if the corresponding image chip satisfies three criteria: (1) the image chip must contain a human shape; (2) the image chip must satisfy the ground plane constraints of the scene; and (3) the image chip must contain a high ratio of foreground pixels (as opposed to static background pixels. FIG. 2 graphically depicts detections 21, 23, 25, 27, 29 within a frame 28 of video data.

A human contour detector is applied using histograms of oriented gradients (HOG) features to detect if the image chip contains a human shape. Histograms of oriented gradients provide a characterization of object contours which is sufficiently invariant to lighting conditions and color contrast, and can be used to train a support vector machine (SVM) classifier that detects a human shape with sufficiency accuracy.

A moving person detection process based solely on contour-based detectors tends to produce multiple false positives per frame for the types of large and visually complex scenes common in video surveillance applications. In order to reduce the frequency of false positive detections, prior information about the scene and the dynamic nature of video is used.

Most surveillance cameras capture scenes in which an object of interest moves along an approximate ground plane that remains fixed (notable exceptions include active pan-tilt-zoom cameras and views that depict multiple levels, stairs, etc.). When this assumption regarding a fixed approximate ground plane is reasonable, information about the ground plane can be used to eliminate false positive detections based on the size and position of the detection. The information about the ground plane may be learned during an offline training step (e.g., by tracking a limited number of people moving on different portions of the ground plane).

The ground plane information may be encoded in a perspective model. More specifically, the ground plane information may be a perspective model that learns a planar homography, which maps a foot position to an expected head position. If all persons in a scene are standing upright on a planar surface, then the foot-to-head mapping is an affine map between planes in 3D space, specifically, a translation by the height of the person. For a candidate bounding box, the normalized "perspective error" of the bounding box position $\vec{p} = [x, y, w, h]$ is measured as:

$$\varepsilon_{per}(\vec{p}) = \frac{h - h_{est}(\vec{p})}{h} \quad (1)$$

where $h_{est}$ is an estimated height for position $\vec{p}$, computed by mapping a foot position to a head position according to the scene homography, and then taking the difference between projected head position and actual foot position.

To further reduce the significant number of human contour false position detections generated by static background patterns, a dynamic background model of the video scene is created. Typical "background subtraction" techniques learn adaptive statistical models of static background at the pixel level, then compare new frames of video to these models in order to estimate which pixels depict moving foreground.

Some embodiments incorporate a background subtraction technique that maintains an adaptive Gaussian mixture model in 3D color space for every pixel. This offers some robustness to shadow effects because of the multimodal form of the resulting background model. A foreground ratio is measured for each candidate bounding box, computed as the ratio of all pixels within the box that are labeled as foreground by the model. An example of such a background subtraction technique appears in C. Stauffer and W. Grimson, "Adaptive background mixture models for real-time tracking," in *Proceedings of IEEE Conference on Computer Vision and Pattern Recognition*, 1999, the contents of which is incorporated by reference in its entirety.

Each of the three detection criteria produces a real-valued score that indicates the degree to which that criterion is met for detection position $\vec{p}$: the output of the SVM human contour detector $s_{cont}(\vec{p})$, the perspective error $\varepsilon_{per}(\vec{p})$, and the foreground ratio $r_{fore}(\vec{p})$. The fused detections result from a function $f(s_{cont}(\vec{p}), \epsilon_{per}(\vec{p}), r_{fore}(\vec{p}))$ mapping all three values to either 1 (detection) or 0 (no detection).

For computational efficiency, this function may be decomposed into a combination of individual thresholds applied to each value. By employing individual thresholds, a cascaded detection strategy can be used to improve computational efficiency. The computationally simpler criteria (foreground ratio and perspective error) are evaluated first in order to rule out most candidate bounding box positions. As a result, the computationally expensive HOG features must only be generated at relatively sparse locations and scales. All three thresholds may be selected empirically from training data.

Figure 3:
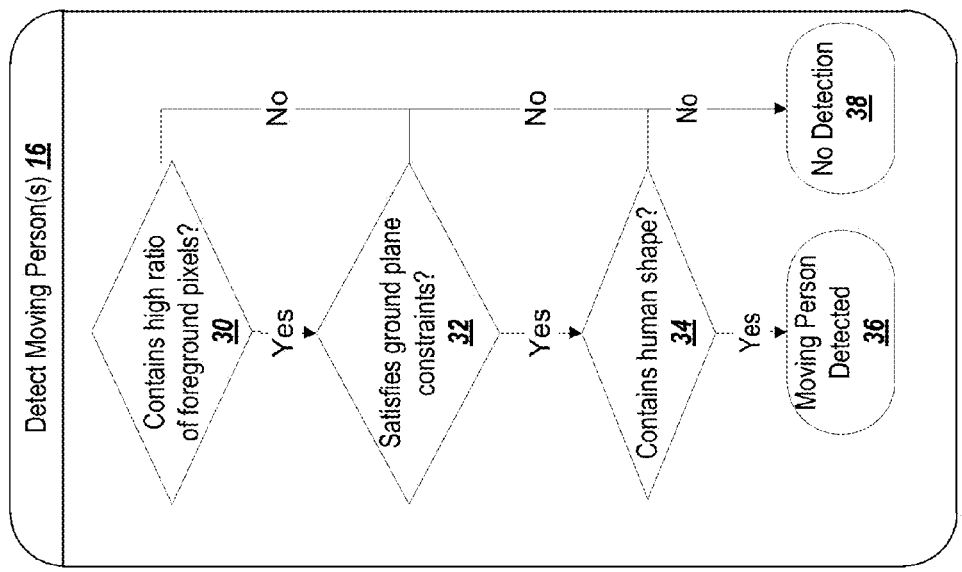
FIG. 3 depicts a block flow diagram for a module that detects moving persons in a video frame, in accordance with an embodiment.

FIG. 3 is a flow diagram depicting the detect moving person(s) module 16 according to some embodiments. An image chip (e.g., portion of the frame identified by a window) is first analyzed to determine if it passes the threshold for containing a high ratio of foreground pixels (30). If not, there is no detection (38) and the window is moved to a new location in the frame. If the image chip passes the detection threshold for foreground pixels, the image chip is analyzed to determine if it satisfies the ground plane constraints (32). If it does not, there is no detection (38) and the window is moved to a new location in the frame. If the image chip does satisfy the ground plane constraints, the image chip is analyzed to determine if it contains a human shape (34). If it does not, there is no detection (38) and the window is moved to a new location in the frame. If the image chip does contain a human shape, a moving person is detected (36) and the image chip may be termed a detected moving person (DMP) image chip (36). The image information for locating the DMP image chip in stored video data is stored in a record in detections storage 22. In other embodiments, the DMP image chip itself may be stored in a record in detections storage 22.

One of ordinary skill in the art will recognize that a DMP image chip may contain an image of a person that is not moving at the time the image was taken, but the person moved some time in the recent past such that the image satisfies the threshold for the ratio of foreground pixels.

To achieve additional speedup, a graphics processing unit (GPU) implementation of parallelized HOG feature computation can be employed, such as that appearing in G. Dalley, "Improved robustness and efficiency for automatic visual site monitoring," Ph.D. dissertation, Massachusetts Institute of Technology, Dept. of Electrical Engineering and Computer Science, 2009, which is incorporated by reference herein in its entirety.

In some embodiments, the moving person detection functionality may additionally incorporate a gender classifier for each detection. This classifier is obtained by re-training a SVM discriminate in HOG feature space, resulting in a gender classifier based on contour characteristics, which capture some information about hair style, clothing style, and body frame. Because HOG features are already computed for moving person detection, performing this additional gender classification is computationally inexpensive.

II. Feature Extraction

After detection, system 10 calculates and stores summary features from each image chip as a way of characterizing appearance. These features should be useful for interpreting attributes of the person and should remain relatively consistent across observations of the same person, despite variation in pixel values due to different poses, camera views, and lighting conditions. One feature that may be included takes the histograms of oriented gradients (HOGs) computed during the detection stage and feeds them into an SVM classifier trained to distinguish between male and female appearance. The resulting classifier score is stored as a feature.

Another implemented feature extraction method that may be included is the formation of "color projection pyramids." First, this method uses an adaptive statistical model to estimate which pixels in the DMP image chip belong to the moving person (as opposed to the background). Then it computes a set of spatially-local color histograms using only those pixels. Each histogram is formed by projecting a small neighborhood of pixels onto a basis of distributions defined in hue-saturation-value (HSV) color space. Finally, these projections are aggregated over increasingly larger spatial areas, forming a pyramid of color projections at multiple spatial scales.

For each detection (each DMV image chip), these features are stored to the database, along with an identifier for the camera view, absolute or relative temporal information about the frame (e.g., a timestamp), and an indication of the position of the image chip in the frame (e.g., a bounding box associated with the detection).

Figure 4:
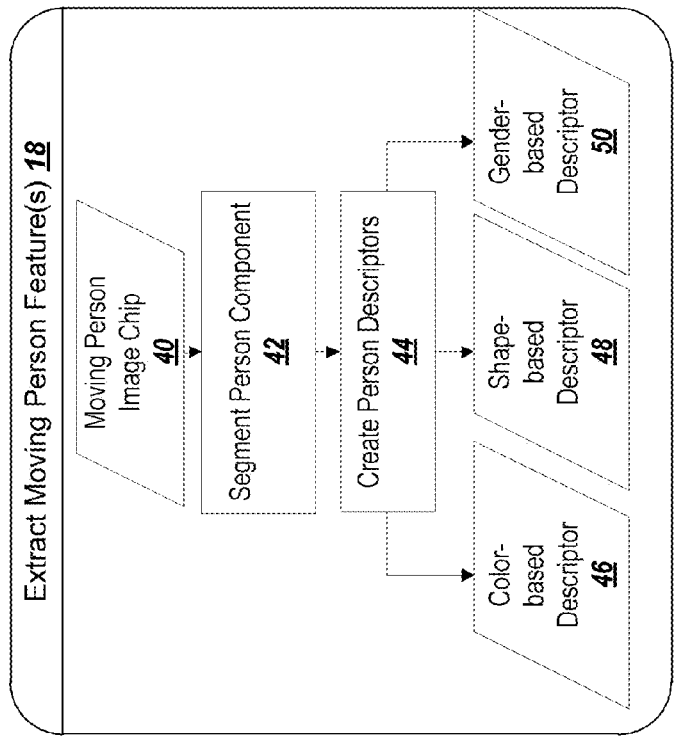
FIG. 4 depicts a block flow diagram for a module that extracts features of a detected moving person (DMP) in an image, in accordance with an embodiment.

FIG. 4 shows an example embodiment of the extract moving person feature(s) module 18. An input DMP image chip (40) is segmented to determine various components of the person (42) in the image. Then, person descriptors are created (44) for the person overall and for components of the person (e.g., head, torso, lower body, bag). The person descriptors may include one or more color-based descriptors (46), one or more shape-based descriptors (48) and one or more gender-based descriptors (50). In the embodiments in which attribute-based searching is employed, the features extracted may depend, at least in part, on the model employed for the attribute-based searching. Accordingly, further details of the extract moving person feature(s) module 18 are discussed below in the section addressing the model developed for the attribute-based searches.

III. Search Engine

Figure 7:
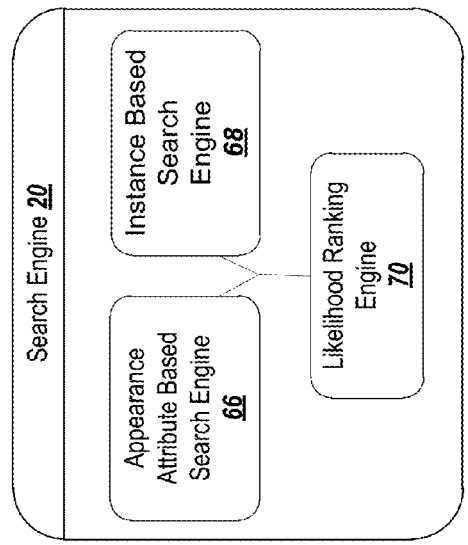
FIG. 7 schematically depicts a search engine module including an attribute-based search engine and an instance-based search engine.
Figure 5:
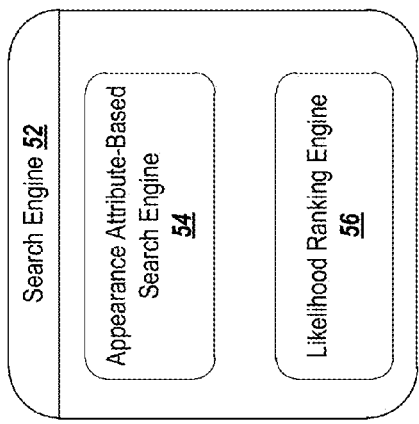
FIG. 5 schematically depicts a search engine module including an attribute-based search engine, in accordance with an embodiment.
Figure 6:
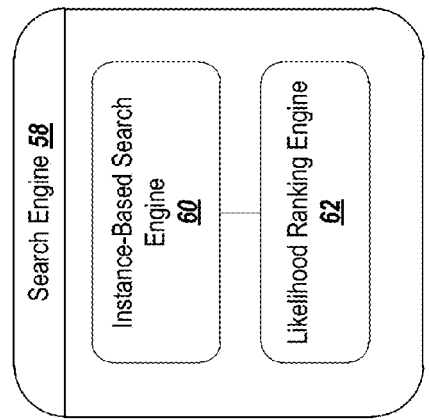
FIG. 6 schematically depicts a search engine module including an instance-based (or specific-person based) search engine, in accordance with an embodiment.

As explained above, the search engine module 20 and/or the system 10 overall may have at least two different modes including an attribute-based search mode and an instance-based search mode. FIGS. 5-7 illustrate different embodiments of the search engine having different searching capabilities. In FIG. 4, search engine 52 includes an appearance attribute-based search engine 54 and a likelihood ranking engine 56. In FIG. 5, search engine 58 includes an instance-based search engine 60 and a likelihood ranking engine 62. In FIG. 6, search engine 20 includes both an appearance attribute-based search engine 66 and an instance-based search engine 68, as well as a likelihood ranking engine 70.

A. Attribute-Based Search

In some embodiments including attribute-based searching capability, the operator or user specifies an attribute profile, which may include some or all of the following characteristics: gender, hair or hat color, clothing color, and bag descriptions (type and color). Given a particular attribute profile, however, there is quite a bit of variation in the way an image chip manifests as a set of pixel values due to changes in view angle, lighting conditions, body type, clothing and bag style, etc. To explain this expected variation, a generative probabilistic model is formulated that gives the likelihood of observing a set of pixel values given an attribute profile. This generative probabilistic model has a hierarchical structure with key factors of the image formulation encoded as latent variables in the hierarchy.

Figure 9:
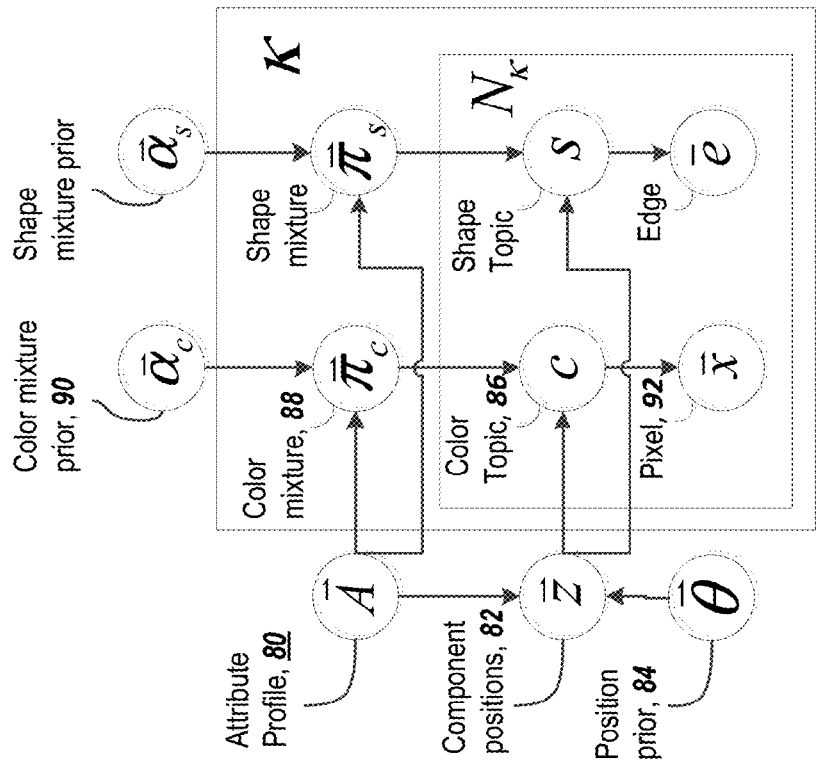
FIG. 9 schematically depicts a generative probabilistic model underlying an embodiment of the attribute-based search functionality, in accordance with an embodiment.
Figure 8:
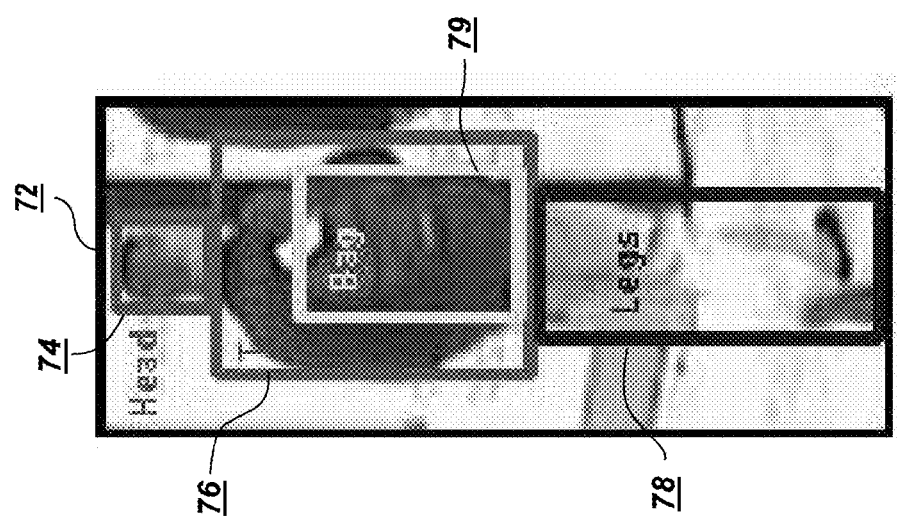
FIG. 8 illustrates sectioning of a detected moving person (DMP) image chip into compartments.

Let $\vec{A}$ represent the set of attributes in the attribute profile comprised of a collection of flags and real-valued color specifications. As illustrated by FIG. 8, the first level of the model hierarchy partitions or segments the DMP image chip 72 into its component parts: head 74, torso 76, lower body 78 and, optionally, one or multiple bags 79. FIG. 9 is a graphical representation of the hierarchical generative model. Nodes represent variables, either directly observed (shaded), latent, or set during training, while arrows represent dependencies. Each image chip contains K component parts and $N_k$ pixels within each component. Vectors $\vec{z}_{head}$, $\vec{z}_{torso}$, $\vec{z}_{lower}$, and $\vec{z}_{bag}$ may be used to encode the 2D positions of their respective components as rectangles within the image chip and vector where vector $\vec{z}_{body} = [\vec{z}_{head}, \vec{z}_{torso}, \vec{z}_{lower}]$ contains the first three position vectors appended together (node 82). The generative model jointly selects the basic position values from a multivariate Gaussian distribution:

$$\vec{z}_{body} \sim N(\vec{\mu}, \Sigma) \qquad (2)$$

where parameter set $\theta = \{\vec{\mu}, \Sigma\}$ (node 84) contains the mean expected position set and the covariance matrix of position changes due to body, clothing, and view angle variation. In addition, if attribute set $\vec{A}$ (node 80) contains bag specifications, each bag position may be drawn from one of three non-parametric distributions depending on the specified bag type (backpack, hand-carried bag, or rolled luggage). In some embodiments, bag position may be defined relative to the position of the body components, so that the generation of $\vec{z}_{body}$ and $\vec{z}_{bag}$ vectors are not independent. The segmentation steps described above may be employed in the segment person component process 42 of FIG. 4.

Once the component positions have been determined, the attribute description governs the color and shape information expressed by the pixel values of each sub-region. In some embodiments, the model employs a technique similar to latent Dirichlet allocation (LDA) to generate the mixture of observed color or shape information. As an example, consider the generation of color information. The model defines a discrete number of color "topics," which may be selected to be twelve common perceptual colors (black, white, gray, tan, brown, yellow, orange, pink, red, green, blue, purple) (node 86). Each local region κ within a component is characterized by a distribution over the color topics $\vec{\pi}_\kappa$ (node 88), a 12-dimensional real-valued vector that sums to one. First, the model draws the color topic distribution from a Dirichlet prior:

$$\vec{\pi}_k \sim \text{Dir}(\vec{\alpha}_k) \qquad (3)$$

The Dirichlet prior distribution accounts for variation in the color mixture due to factors such as style, material composition, shadow effects, and/or object occlusion. The Dirichlet parameters $\vec{\alpha}_k$ (node 90) are set based on the attribute profile (e.g., a "dark red torso" specification may have a bias toward selection of mixtures dominated by red and black topics). In contrast to typical LDA models, the topics in this model are pre-defined, and the parameters of the Dirichlet distribution are set according to the attribute descriptions, not learned in an unsupervised model.

Once the topic distribution has been selected, each pixel within the component region independently selects a color topic according to the distribution given by $\vec{\pi}_k$. Finally, the pixel value is drawn from the corresponding color topic density within the three-dimensional color space. If $\vec{x}$ (node 92) represents a single three-dimensional point defined in hue-saturation-value (HSV) color space, the probability that this point was generated by a color density characterized by mean $\vec{\mu}_c$ and covariance matrix $\Sigma_c$ is given by the quasi-Gaussian expression:

$$p(\vec{x}) = \phi \cdot (-0.5 \cdot \vec{d}(\vec{x}, \vec{\mu}_c)^T \Sigma^{-1} \vec{d}(\vec{x}, \vec{\mu}_c)) \qquad (4)$$

where constant φ normalizes the distribution and $\vec{d}$ is the difference vector between $\vec{x}$ and $\vec{\mu}_c$ with the first element $d_1$ computed to account for the cyclical nature of the angular hue axis which spans from 0 to 1:

$$d_1(\vec{x}, \vec{\mu}_{c1}) = \text{mod}(x_1 \mu_{c1} + 0.5, 1)0.5 \qquad (5)$$

Forming color densities in HSV space, as opposed to RGB space, provides more tolerance to inconsistent lighting conditions.

A similar generative model structure may be applied to shape information within each component region. Instead of using color topics and observed pixel values, the model replaces these with "shape topics" (e.g., multi-scale gradients) and edge-based primitives centered around pixel location. In this case, the Dirichlet distribution that drives the model is governed by the label of the component (head, torso, etc.).

Finally, the real-valued gender score g produced during the detection stage is assumed to be drawn independently from the rest of the model, according to an exponential distribution:

$$s(g) \sim \exp(\lambda) \qquad (6)$$

where s(g) adjusts the sign of the gender score according to the gender label in the attribute profile, or sets the gender score to zero if gender is unspecified, and parameter λ controls the importance of the gender specification relative to all other attribute specifications.

The model structure described above has a set of observable variables O (the pixel values, edge primitives, and attribute profile), a set of hidden, or latent, variables H (the component positions, topic mixtures, and topic labels), and a set of learned model parameters θ (describing various Gaussian, Dirichlet, exponential. and non-parametric distributions).

In the likelihood ranking engine 70 (see FIG. 6), a match score is calculated for each DMV image chip that evaluates the DMV image chip for its degree of match to a given attribute profile. The match score may be computed by maximizing the joint distribution of the model with respect to its hidden variables:

$$m = \max_H P(O, H, \Theta) \qquad (7)$$

This is equivalent to estimating the most likely hidden states to explain the observed image. If a high-probability explanation exists that is compatible with the attribute description and the observed values, this will lead to a high match score. Parts of this maximum likelihood optimization problem can be solved in closed-form. For the variables which cannot be estimated in closed form (e.g., the component positions) a greedy iterated conditional modes (ICM) algorithm may be employed. The ICM algorithm is initialized at the mean position vector and converges quickly to a local optimum.

Figure 11:
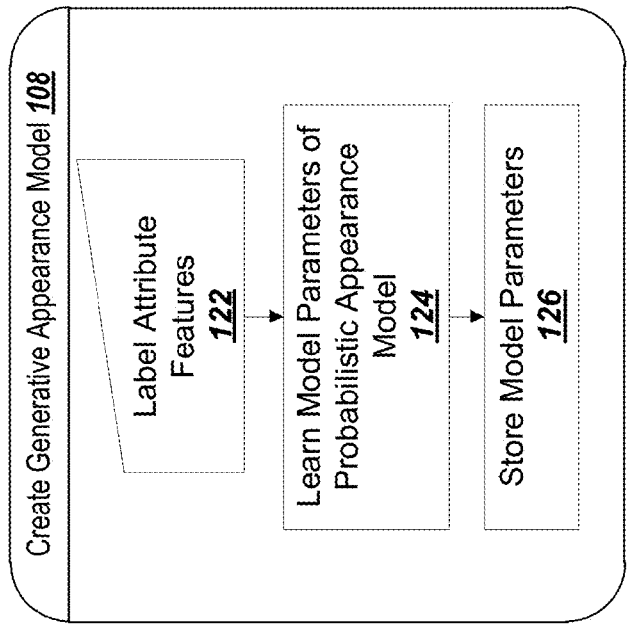
FIG. 11 is a flow diagram depicting creation of a generative probabilistic attribute-based model, in accordance with an embodiment.
Figure 10:
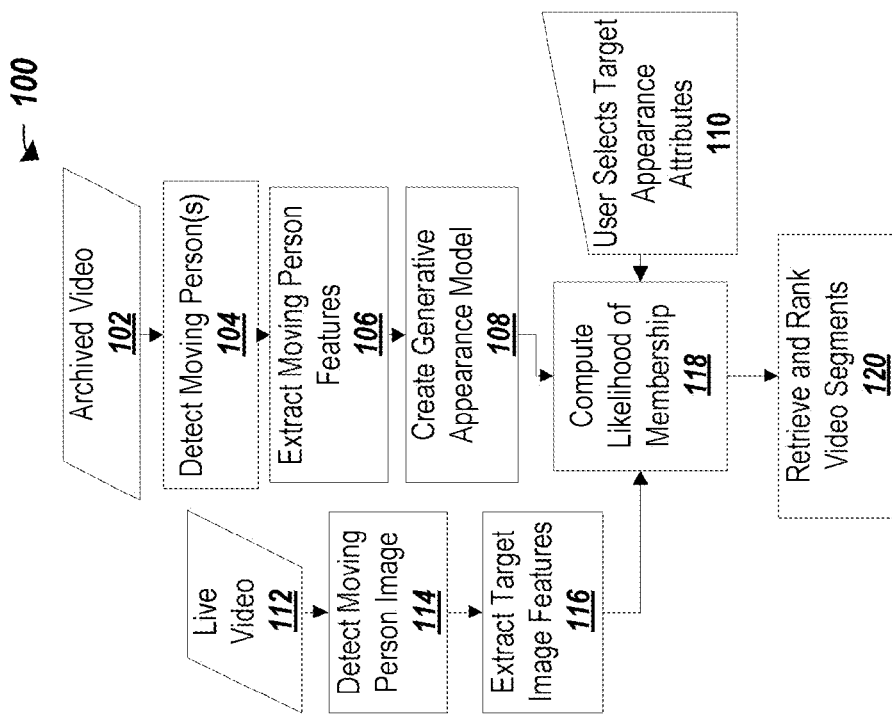
FIG. 10 is a flow diagram depicting an example attribute-based search method, in accordance with an embodiment.

An example embodiment of a method 100 employing an attribute-based search is illustrated by flow diagram in FIG. 10. The method takes as input archived video (102). Moving persons are detected in the archived video frames for identification and/or storage of DMP image chips (104). Moving person features are extracted or calculated from the DMV image chips (106). A generative appearance model is created using the extracted moving person features (108). As shown in FIG. 11, creation of the generative appearance model (108) may include receiving label attribute features as input (122), learning model parameters of the probabilistic appearance model (124) and storing the model parameters (126).

Turning again to FIG. 10, a user may select attributes of a person of interest by providing an attribute profile (110). The method also takes as input live video (112), or archived video of interest, as video input for analysis. A moving person, identified as target detected moving person, is detected in a frame of the video input for analysis and an image chip is saved of the target DMP (114). Features are extracted from the image chip of the target DMP (116). Based on the extracted features for the target DMP, the generative appearance model, and the user specified attribute profile, a likelihood that the target DMP matches the specified attribute profile is calculated as a match score (118). After a match score is calculated for each target DMP in the video input for analysis, images chips for the top scoring target DMPs are retrieved for display to a user (120).

B. Instance-Based Search

An important aspect that may be included exemplary systems and methods is the ability to automatically search for other instances of a person of interest across video from one camera view or from multiple camera views. This mode of search is described as a person-specific search or an instance-based search. Instance-based searching requires accurately finding one or more images of the queried individual (specific person of interest) across a large set of candidate image chips from the detection database.

In some embodiments, the instance-based search is triggered by a user selection of one or more reference images or image chips of a specific person of interest. With the selected one or more reference image chips of the specific person of interest, the system builds a detector to recognize other appearances of the same specific person-of-interest. The system does so by comparing features of the reference person of interest image chip or chips, which are considered "positive" examples, to many negative example image chips in which the person of interest is unlikely to appear (e.g., images collected on a different day at the same location), which are considered "negative" examples, and determining the relatively unique features associated with the individual's appearance that can be used for detection. The person-specific detector may be built by training a support vector machine (SVM) classifier to distinguish between positive and negative training data, effectively learning the region of the feature space associated with the person of interest.

After the person-specific detector has been built, it is applied to extracted features of DMP image chips from video collected by the same camera and/or nearby camera views within a time window surrounding the initial trigger or within a time period of interest. Practically, this may be achieved by extracting all records from the moving person database that fit within the time and space constraints, and then using the person-specific detector to score the relevance of each record. The top-scoring records are then displayed to the operator through a scrollable menu of image chips.

Figure 12:
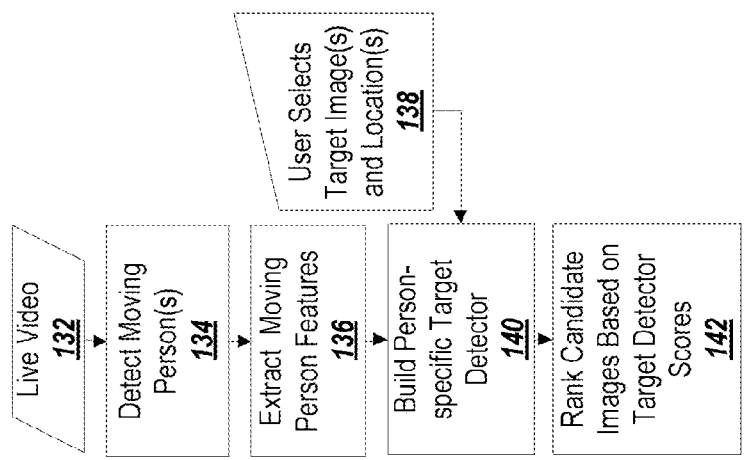
FIG. 12 is a flow diagram depicting an example instance-based search method, in accordance with an embodiment.

An example embodiment of a method 130 employing an instance-based search is illustrated by a flow diagram in FIG. 12. The method 130 takes live video, or archived video of interest, as input (132). One or more moving persons are detected in the input video (134). Features are extracted for each of the detected one or more moving persons (136). A user selects one or more target image(s) as showing the person of interest (target) and may specify location(s), which may include temporal and spatial information, to search for other images of the person of interest (138).

Based on the user selection(s) regarding the person of interest and the extracted moving person features for the person of interest, a person-specific target detector is built (140). After the person-specific target detector is built, it is applied to records including DMP image chips for archived video, to produce a match score for each (142). The records are ranked by match score (142).

Figure 13:
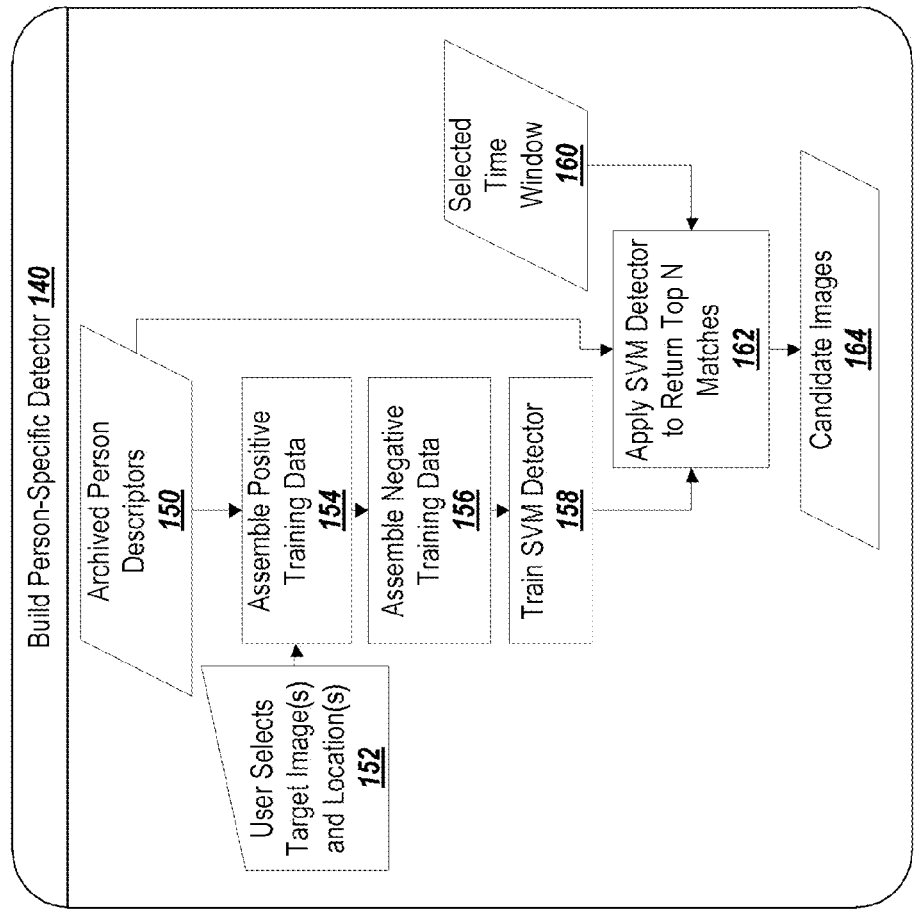
FIG. 13 is a flow diagram depicting the building of a person-specific detector for an instance-based search, in accordance with an embodiment.

FIG. 13 shows a flow chart for building an example person-specific detector (140). As shown by FIG. 13, the system receives a user selection of one or more target image(s) (DMP image chips) of the person-of-interest and location(s) information (152). Features previously calculated from the selected DMP image chips are assembled from the archived person descriptor storage to form the positive training data (150) Negative training data, which does not include the person of interest, is assembled (154) based on the previously calculated archived person descriptors. The SVM detector is then trained to develop the person-specific detector (158). A time window of video of interest may be selected or specified by the user (160). The SVM detector (person-specific detector) is applied to video of interest in the time window and it returns top matches for images of the person of interest (162), which are output as candidate images (164).

IV. Video Retrieval and Path Reconstruction

As explained above, the user may perform searches based on either an attribute description or an instance-based search. Once the search is complete, the operator can browse through image chips using a search results interface of the GUI. By selecting any of the results, the user can retrieve a segment of video corresponding to that detection (DMV image chip).

In some embodiments, a system or method may incorporate path reconstruction for an individual under video surveillance. To use this feature, the user or operator may select multiple observations of the person of interest from a search results pane of the search interface and designates these as "anchor points" that define a path through one or more cameras. As the user makes these selections, the system updates the path estimate based on the new information, and automatically extends the path or fills in gaps in the path, where it can do so with high confidence. As the system revises the path estimate, it may display the current version of the path on a map and on a timeline incorporated into GUI.

Finally, in some embodiments, the system or method may provide a composite video view digitally cropped to focus on the person of interest. After path reconstruction is complete, the operator can play through this path view or control it temporally by moving a slider linked to a timeline. The path view is an easy-to-navigate record of a person's activities and interactions, as captured by a distributed surveillance system. In addition, the operator can direct the tool to write the path view to a video file, so it will be saved for later review.

Figure 14:
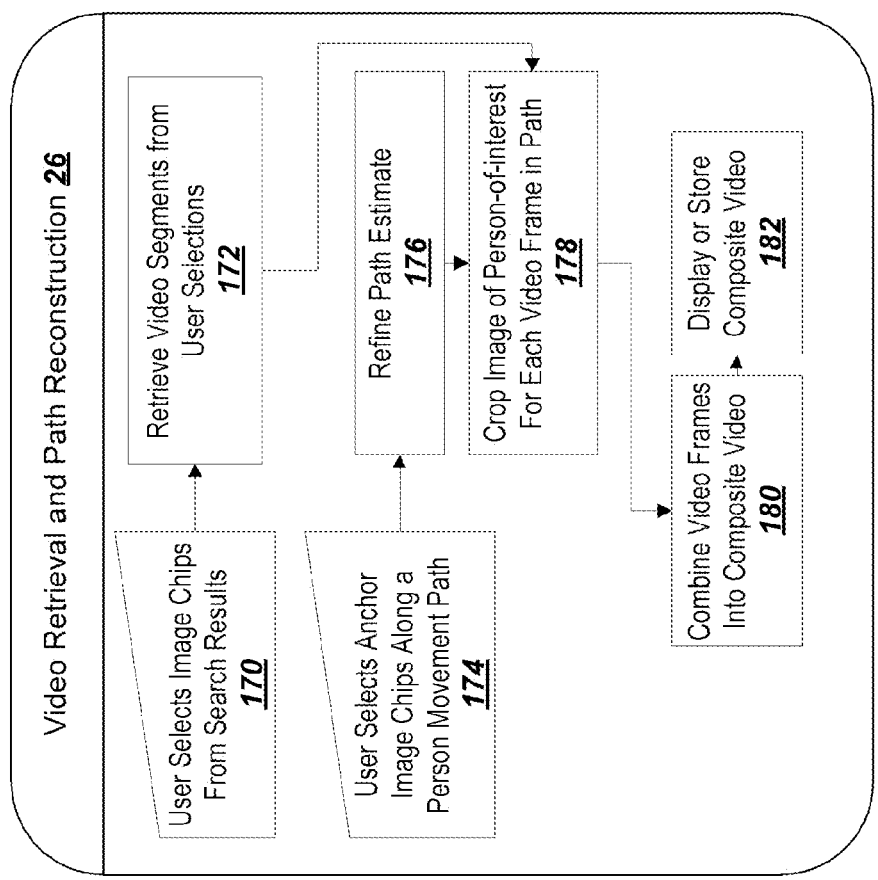
FIG. 14 is a flow diagram depicting a video retrieval and path reconstruction module, in accordance with an embodiment.

FIG. 14 illustrates a method performed by the video retrieval and path reconstruction module 26, in accordance with some embodiments. A user selection of image chips from the search results is received indicating that the image chips show the person of interest (170). Based on the selection, the system may retrieve video segments corresponding to the user selection (172) and display them to a user. The system may also receive a selection of additional anchor image chips along a movement path of the person of interest (174), which may be used to refine an estimate of the path of the person of interest (176). Each video frame in the path may be cropped to show the person of interest. In some embodiments, the cropped frames may be combined into a composite video (180), which may be displayed and/or stored (182).

V. Graphical System Interface

Figure 15:
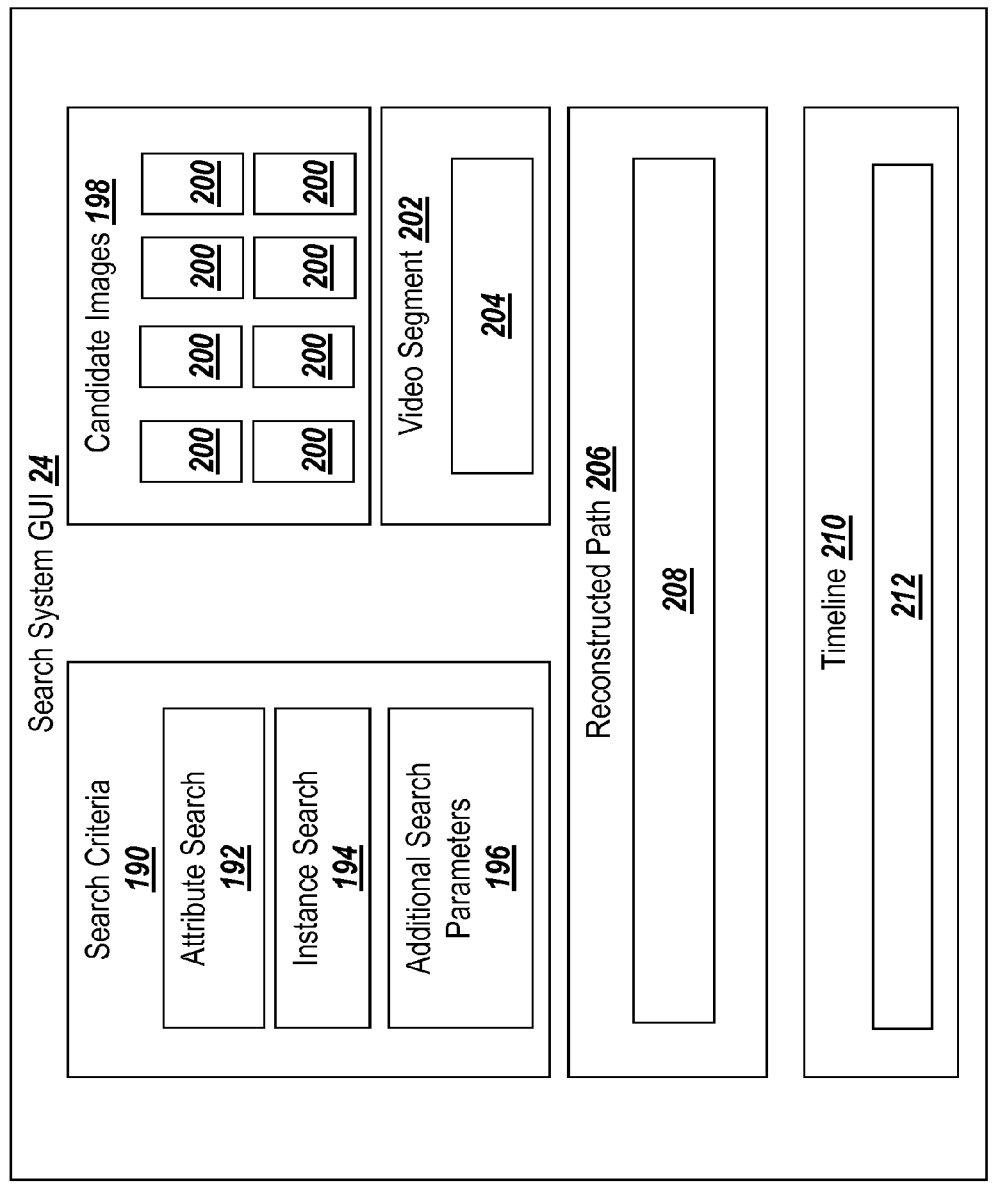
FIG. 15 schematically depicts a graphical user interface for a video surveillance system, in accordance with an embodiment.

FIG. 15 schematically depicts a GUI 24 for the search system 10. The GUI 24 may include a search criteria area 190 for entering or viewing search criteria. The search criteria area 190 may include an attribute search area 192 for entering or viewing criteria specific to attribute-based searching, an instance-based search area 194 for entering or viewing criteria specific to instance-based searching, and an additional search parameters area 196 for entering or viewing additional criteria that may be common to both attribute-based searching and instance-based searching.

The GUI 24 may include a candidate images area 198 for showing DMV image chips 200 having the highest matching scores. The candidate images area 198 may allow a user to select one or more DMV image chips 200 as image(s) as a person of interest. Further, when a DMV image chip is selected, a corresponding video segment 204 may appear in a video segment area 202. Further, the video segment area 202 may include controls for viewing the corresponding video segment 204. The GUI 24 may further include a reconstructed path area 206 that displays a map of a reconstruction 208 of the path of the person of interest. The reconstructed path map 208 may be interactive (e.g., selection of a portion of the reconstructed path map may display a corresponding video segment). The reconstructed path area 206 may further include tools (e.g., tools for identifying anchor points). The GUI 24 may further include a timeline area 210 including a timeline 212, which may be interactive (e.g., selection of a portion of the reconstructed path may display a corresponding video segment). The timeline area 210 may further include tools for manipulating or selecting a portion of the timeline (e.g., zoom, crop). Selection of one or more DMV image chips 200 may cause corresponding portion(s) of the reconstructed path map 208 and the timeline 212 to be highlighted. In some embodiments, the same tools may be used for selection and manipulation of the reconstructed path 208 and of the timeline 212.

Figure 19:
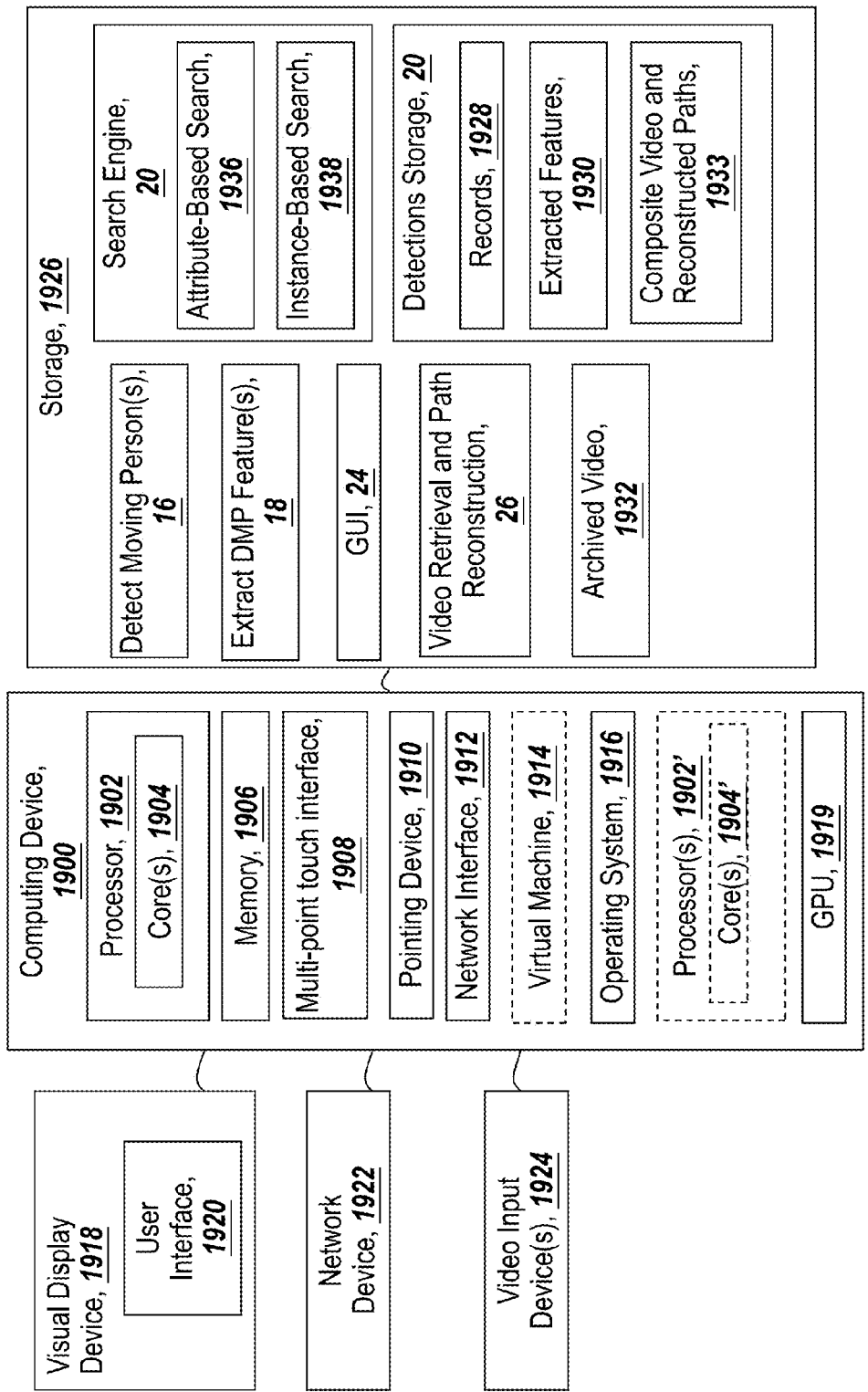
FIG. 19 depicts an exemplary computer system suitable for implementation of some embodiments taught herein.

An embodiment of the video surveillance system 10 is depicted in FIG. 19, in which a computing device is programmed to operate as the video surveillance system.

VI. Example Implementation with Attribute-Based Search

After experimentation with multiple versions of the model framework for attribute-based searching described above, a simplified implementation was employed to create and test an example system that included a search tool for attribute-based searching, video retrieval, and path reconstruction. The "search tool" of the example system did not incorporate instance-based searching. In the simplified implementation, component position variables represented boundary locations along the vertical axis only, while positions along the horizontal axis were pre-determined and fixed. All location variables were expressed as ratios of image chip height in order to make their distributions invariant to resolution. In addition, this version was limited in scope to color topic mixture representations (not shape mixture representations) in order to improve computational efficiency.

To learn the model parameters, ground truth was labeled for training purposes from several hundred images sampled from multiple video datasets. The labeled ground truth included component descriptions, positions, and perceptual color labels. The mean vectors and covariance matrices or all multivariate Gaussian distributions were set using maximum likelihood estimation, while each of the-three bag position distributions was learned directly from labeled examples using kernel density estimation. Finally, the method for setting the Dirichlet parameters according to the attribute profile was selected through empirical testing.

The example system processed surveillance video to extract instances of moving persons and then stored these instances (as time and location tagged descriptors) to a database. To allow an operator to quickly and easily search over these records, the system included the interactive search tool that operated directly on the database. The search tool received a set of search criteria through a graphical user interface, retrieved all records from the detection database that fell within the specified time period and location, applied the probabilistic model described above to score how well each record matches the specified attribute profile, ranked the records in order of best match, and then displayed the top set of matches back to the operator for further investigation of the relevant video.

Figure 16:
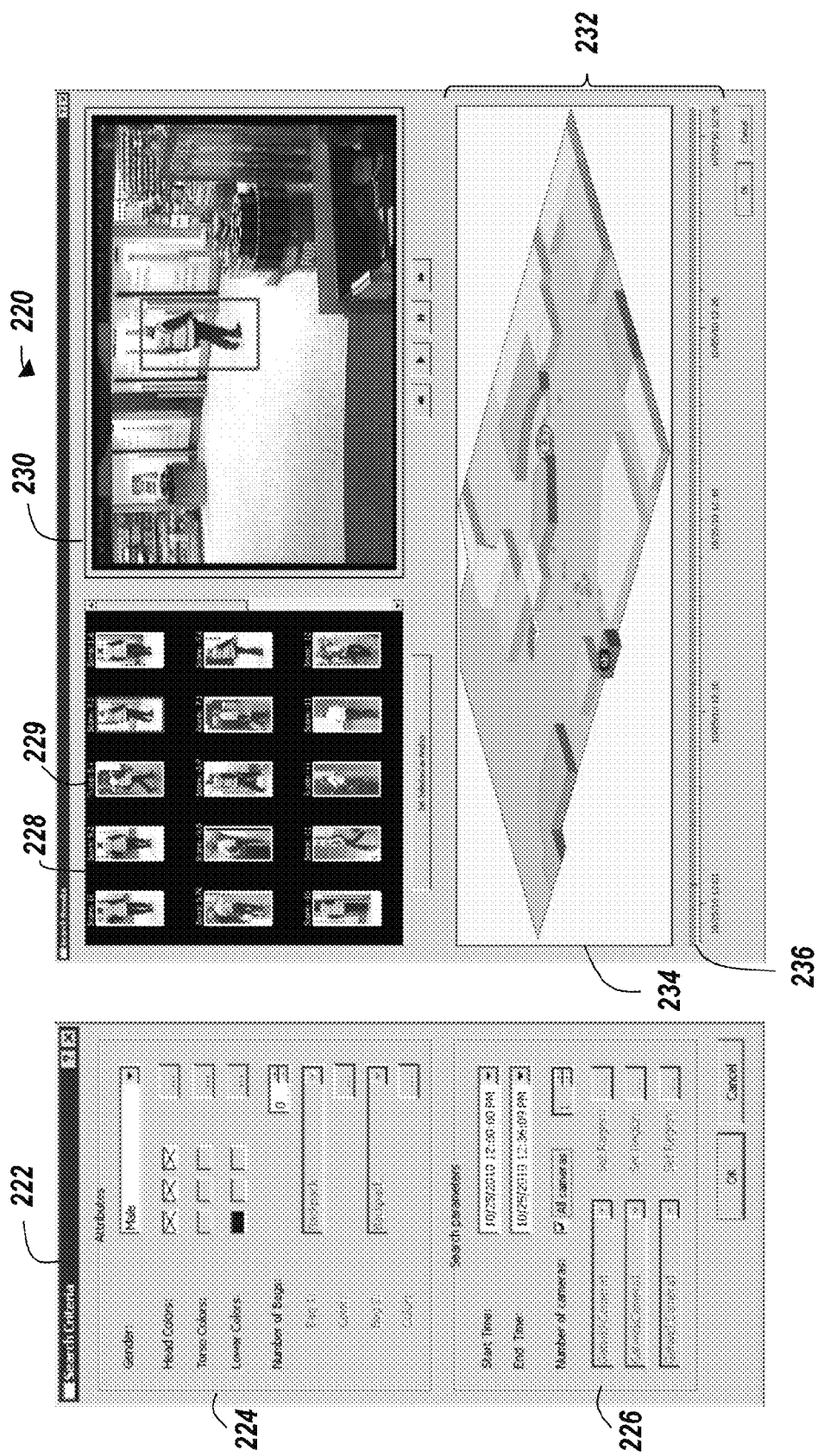
FIG. 16 is a screen shot of a graphical user interface of an example video surveillance system constructed in accordance with an embodiment.

FIG. 16 shows an example screen shot 220 of the graphical user interface of the search tool. Launching an attribute-based person search brought up a search criteria input menu 222, which was divided into an attribute profile section 224 and a search localization section 226. Within the attribute profile section 224, the operator could specify any subset of attribute options represented in the menus. Any inputs not provided by the operator were left as unspecified by default, meaning they did not factor into the search results.

A gender menu allowed for selection of male or female. A head color menu allowed for selection of color information corresponding to either hat or hair. A torso clothing color menu allowed specification of upper body clothing color(s), which typically corresponds to shirt, coat or blouse color descriptions. A lower body clothing color menu receives information about pants, shorts, skirts, and/or prominent shoes. Finally, the bag options allowed the user to specify one or more bags in the possession of the person of interest. The bag option receives a type description (e.g., backpack, hand-carried bag, or rolled luggage) in addition to color patterns. For example, in attribute profile section 224 of search criteria input menu 222 shown in FIG. 16, the operator specified "male" gender, "yellow" shirt color, and "Black" pants. All color selections may be made through a palette interface that allows selection from among a range of shades within multiple common perceptual color categories.

In the search localization section 226, the operator could select a start time and end time for conducting the search, which may span up to multiple days of archived video. The operator could also choose the subset of camera views over which to search, focusing in on particular regions within individual camera scenes (e.g., doorways or pedestrian passageways) if desired. Once all attribute and search localization criteria was entered, the search process launched and the search tool accessed the detection database to compute all relevant match scores. The time required to finish this processing was typically at least a few seconds and scaled in rough proportion to the area and time window of the search, depending on variations in pedestrian frequency.

The search results interface included three panels, as depicted on the right side of FIG. 16. The first panel 228 contained a set of image chips 229 representing the top matches to the attribute search criteria. These chips 229 were filtered to avoid redundant displays of the same person in consecutive frames of video. The operator could scroll through these image chip results 229 and click on any of them to retrieve the corresponding video content. Image chips 229 were arranged in order of descending match score from left to right and top to bottom. As shown in FIG. 16, image chips further down the progression were inexact, but close, matches, such as females with the specified clothing, or subjects with off-white rather than yellow shirts. The example search shown in FIG. 16 was performed over approximately 30 minutes of data from each of three camera views obtained from the i-LIDS dataset collected at Gatwick Airport in London.

The second panel displays the video frame 230 from which the selected image chip was detected, and allowed the operator to view the video using a standard set of playback controls. The third panel 232 displayed both a timeline 234 and a map 236 of the facility containing estimated times and locations for each of the top matches. The operator had the option to retrieve video by selecting an individual detection directly from the map 234 or from the timeline 236, rather than from the image chip set 229.

The search tool of the example system provided both a clear way for users to enter structured search queries and a mechanism to explore potential sightings of a person of interest throughout all available surveillance video. It is important to note that if there is a useful video detection, it will not always appear as the first (most highly scored) image chip due to inaccuracies in witness descriptions, limitations in the type of attribute inputs accepted by the search tool, or imperfections within the generative appearance model. However, if the useful content appears somewhere among the top match results, it is typically a much easier and quicker process for an operator to browse through a set of image chips and focus in on the relevant content than it is for that operator to manually scan large amounts of raw video.

A. Moving Person Detection in Example System

The search tool described above was tested on several surveillance video datasets. including the i-LIDS dataset collected at Gatwick Airport, sample video collected at a major US airport, and sample video collected at street intersections by outdoor law enforcement surveillance cameras. However, the ability of the search tool to measure performance quantitatively was limited by the availability of detailed ground truth for these datasets. In order to compute the quantitative results for moving person detection discussed in this section, a particular area surveilled during the US airport video data collection was selected and labeled ground truth for all pedestrian activity occurring within that area over a defined period of time. The surveillance video of this approximately 50 square meter region had image resolution along the height of pedestrians ranging from about 80 pixels to 120 pixels. Ground truth was collected corresponding to the location and attribute-based appearance of each person who passed through this region. Analyzing sampled frames of video at a rate of 1 Hz, there were a total of approximately 1,000 instances (i.e., frame appearances) of 150 unique pedestrians observed during ground truth labeling.

In addition, the location of every pedestrian passing through a typical outdoor street scene captured by law enforcement surveillance video was also labeled. The outdoor video contains examples of pedestrians at about 50 to 200 pixels of height resolution as well as moving vehicles. Ground truth was generated at a rate of 1 Hz, covering approximately 2,200 instances of 100 unique pedestrians.

The output of the moving person detection module depends upon three threshold values corresponding to the three criteria for detection described above, namely thresholds for the ratio of foreground pixels, the satisfaction of ground plane constraints, and containing a human shape. Varying these threshold values affects both the probability or detection (PD) and the false positive rate (FPR). Therefore, parameter sweeps were conducted for both for the indoor and outdoor surveillance video to find threshold values that yielded the best detection performance, using the ground truth data described above to evaluate PD and FPR metrics. For each person passing through the region of interest, a correct detection was counted if the module detected the moving person in at least one analyzed frame of video. On the other hand, any detection that did not correspond to an entire person was counted as a false positive. Table I shows PD and FPR for the selected detection thresholds or each dataset.

TABLE 1

Moving Person Detection Performance

| Video Data | PD | FPR |
|---|---|---|
| Airport indoor | 97% | 0.0045 per sec. |
| Law enforcement outdoor | 89% | 0.25 per sec. |

The module achieved the best results on the indoor airport video, detecting an instance of almost every pedestrian while pulling in false positives at a relatively low rate (so that they constitute a small percentage of records in the detection database). The outdoor scene proved more difficult for several reasons. Some of the missed detections were from pedestrians who never completely enter the scene before exiting, or who appear partially occluded behind vehicles. In addition, most of the false positives were generated by parts of moving vehicles or by trees blowing in the wind (clutter which is not present in the indoor scene). Overall, the detection process supports good search capability, especially when the video captures a complete view of the subject, but the performance depends heavily on the characteristics or the scene.

B. Attribute-Based Search in Example System

The example probabilistic appearance model is a mechanism to score the likelihood that each image chip depicts a person with the specified attribute set. When the model functions well, all examples of persons matching the provided description appeared at the top of the match list, which was ranked in order of descending likelihood scores. To test the performance of the model, multiple sample searches were conducted over the portion of video for which ground truth labels had been generated. The attribute profiles for each of eleven test searches were selected arbitrarily by taking descriptions from the ground truth labels that matched one or more persons who appeared within the video (excluding gender, which was tested separately). The test searches are listed in the legend 242 of FIG. 4, which includes a graph 240 of Recall versus False positives for the eleven test searches.

Figure 17:
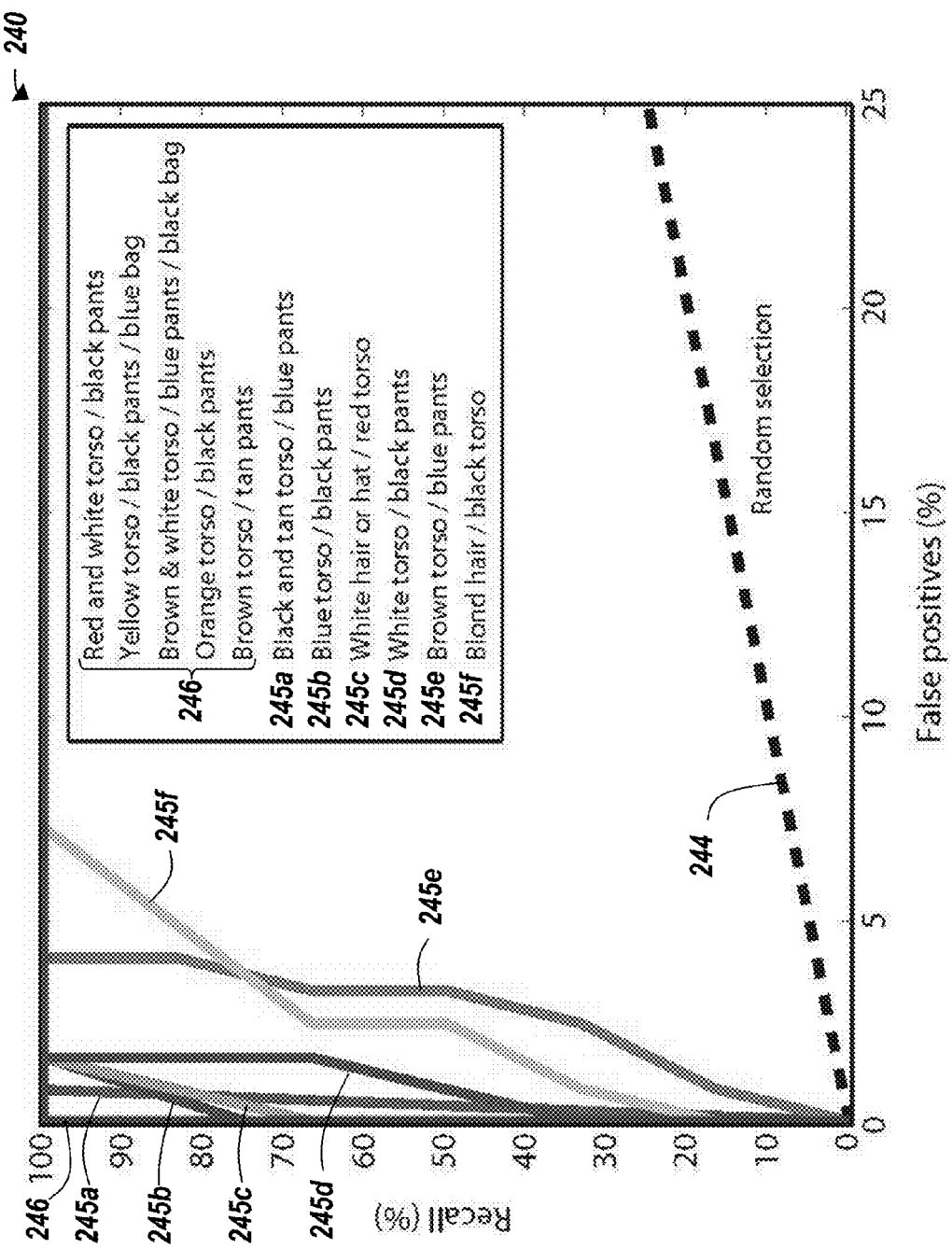
FIG. 17 is a graph of performance of an exemplary video surveillance system, in accordance with an embodiment.

For each test search, a performance curve was generated by varying the number of top search results returned by the search. Adding to the number of results increases the chance of finding all true matches, but it also increases the occurrence of false positives. The y-axis in FIG. 17 plots the recall, or the percentage of all true matches returned by the search and the x-axis plots the number of returned false positives normalized by the total number of false positive individuals in the database. Note that by these metrics, an algorithm that assigned random match scores to image chips would have an expected tradeoff represented by the dotted line 244 in FIG. 17.

As expected, all search results using the proposed model perform significantly better than the random-scoring baseline. However, there is noticeable variation in error rates depending on the particular attribute set. Five of the eleven sample searches, specifically red and white torso/black pants, yellow torso/black pants/blue bag, brown and white torso/blue pants/black bag, orange torso/black pants, and brown torso/tan pants (collectively represented by 246 in FIG. 17), found all true matches before returning any false positives. Other sample searches, specifically black and tan torso/blue pants 245*a*, blue torso/black pants 245*b*, white hair or hat/red torso 245*c*, white torso/black pants 245*d*, brown torso/blue pants 245*e*, and blond hair/black torso 245*f*, returned multiple false positives before recovering all matches. The more specific search queries (especially those with only one true match among all pedestrians) tend to show better results because these profiles contain the most discriminating information. On the other hand, more generic descriptions seem to pull in some false positives along with all of the true positives.

Finally, the accuracy of the gender classifier was evaluated by testing the gender classifier on multiple surveillance datasets. Measured correct classification rates ranged from 75% to 85%. When used in combination with stronger attribute cuts, the gender classifier tended to move more matches with the specified gender toward the top of the match list. This indicates that it may also be useful to include other "weak" classifiers based on contour analysis such as height or body frame information.

The search capabilities of the example system provided a useful way for security personnel or investigators to sift through large quantities of video data to find a particular person of interest given a recent observation or witness report describing that person. This capability may be applied in two different modes: to perform real-time monitoring for any persons that match an attribute profile (e.g., at all entryways to a facility) or to perform forensic search over archived video data. In this way, the search tool provided the operator with a number of leads to potentially valuable and easily accessible video content.

However, the performance of the attributed-based search model depended on both the quality of the recorded video (especially the resolution and look angle) and the characteristics of the environment under surveillance. For example, outdoor views of street intersections seem to present more challenges than relatively controlled indoor settings due, at least in part, to more sources of motion, such as vehicles and trees blowing in the wind, in addition to more variation in illumination conditions due to natural light changes and building shadows. Another important factor was crowd density. A typical subject in any given frame of the video analyzed during testing had a high likelihood of at least some type of partial occlusion from other movers or static objects; however, the video dataset did not contain solid masses of people, which would have made successful detection and analysis more difficult. In addition, different locations may exhibit sufficiently different clothing styles to degrade the accuracy of the probabilistic appearance model. When this is the case, the model may be re-trained directly on new (and more representative) sample data.

VII. Additional Exemplary Method

Figure 18:
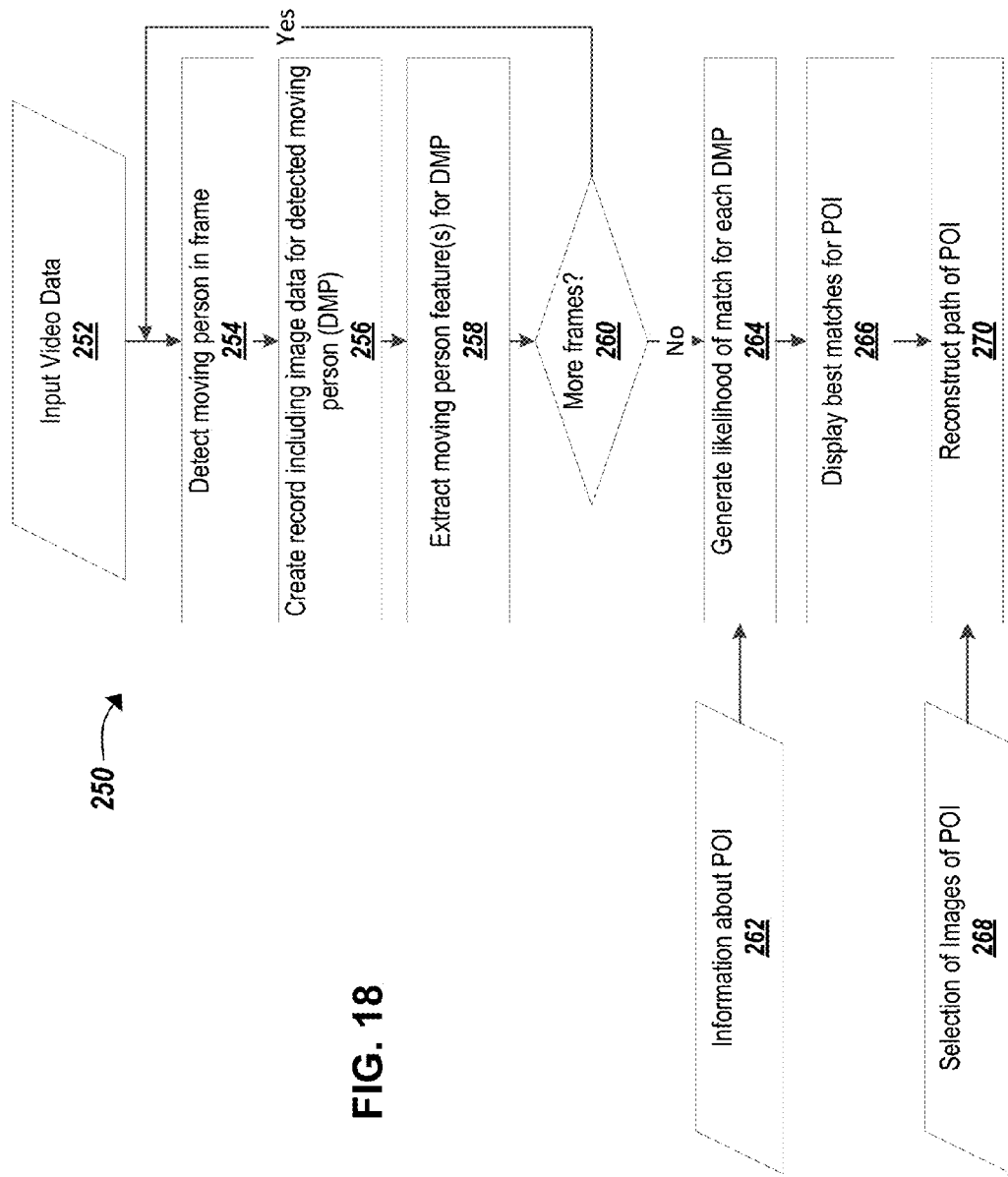
FIG. 18 is a flow diagram depicting an exemplary method of video surveillance.

FIG. 18 illustrates a computer-implemented method (250) for analyzing surveillance data, in accordance with some embodiments. A moving person is detected in a frame of the input video data (254). A record is created that includes image data for the detected moving person (DMP) (256). Feature(s) are extracted from the record for the DMP (258). Although not explicitly shown in the flow diagram, multiple moving persons may be detected in each frame and a record created for each of the DMPs. As indicated by decision block (260) the moving person detection (254), record creation (256) and feature extraction (258) processes are repeated all additional frames of interest.

Information regarding a person of interest (POI) is received (262). For an attribute-based search, the information includes one or more attributes of the POI. For an instance-based search, the information includes at least one image of the POI or an identification of at least one image of the POI. Based on the extracted features for the DMP and the received information regarding the (POI), a score is generated that indicates the likelihood that the DMP is a match to the POI (264). Images are displayed for the DMP with the highest match scores (266), which are the identified candidate matches to the POI. Based on a user selection of images of the POI (268) and spatial and temporal information from the records of the selected images, a path of the POI is reconstructed (270).

VIII. Exemplary Computing Devices

FIG. 19 is a block diagram of an exemplary computing device 1900 that may be used to perform any of the methods provided by exemplary embodiments or may be incorporated into any exemplary systems. The computing device 1900 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein.

The computing device 1900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more USB flash drives), and the like. For example, memory 1906 included in the computing device 1900 may store computer-readable and computer-executable instructions or software for implementing exemplary embodiments. The computing device 1900 also includes processor 1902 and associated core 1904, and optionally, one or more additional processor(s) 1902' and associated core(s) 1904' (for example, in the case of computer systems having multiple processors/cores), for executing computer-readable and computer-executable instructions or software stored in the memory 1906 and other programs for controlling system hardware. Processor 1902 and processor(s) 1902' may each be a single core processor or multiple core (1904 and 1904') processor. Computing device 1900 may optionally include a graphical processing unit (GPU) 1919 for analyzing and displaying image information.

Virtualization may be employed in the computing device 1900 so that infrastructure and resources in the computing device may be shared dynamically. A virtual machine 1914 may be provided to handle a process running on multiple processors so that the process appears to be using only one computing resource rather than multiple computing resources. Multiple virtual machines may also be used with one processor.

Memory 1906 may include a computer system memory or random access memory, such as DRAM, SRAM, EDO RAM, and the like. Memory 1906 may include other types of memory as well, or combinations thereof.

A user may interact with the computing device 1900 through a visual display device 1918, such as a screen or monitor, that may display one or more user interfaces 1920 that may be provided in accordance with exemplary embodiments. The visual display device 1918 may also display other aspects, elements and/or information or data associated with exemplary embodiments, for example, the search system interface. The visual display device 1918 may be a touch-sensitive display. The computing device 1900 may include other I/O devices for receiving input from a user, for example, a keyboard or any suitable multi-point touch interface 1908, a pointing device 1910 (e.g., a mouse, a user's finger interfacing directly with a display device, etc.). The keyboard 1908 and the pointing device 1910 may be coupled to the visual display device 1918. The computing device 1900 may include other suitable conventional I/O peripherals.

The computing device 1900 may include one or more video input devices 1924, such as one or more video cameras, that may be used by a user to provide one or more video input streams.

The computing device 1900 may include one or more storage devices 1926, such as a hard-drive, CD-ROM, or other computer readable media, for storing data and computer-readable instructions and/or software that implement exemplary embodiments as taught herein. The storage device 1926 may be provided on the computing device 1900 or provided separately or remotely from the computing device 1900.

Exemplary storage device 1926 may store any suitable information required to implement exemplary embodiments. For example, the storage 1926 may include detections storage 20, which may include storage for records including address information for DMP image chips 1928, extracted features for DMP image chips 1930, and composite video and reconstructed paths 1933. Storage 1926 may also store archived video 1932.

Exemplary storage device 1926 may store computer-readable computer-executable instructions for implementing the detect moving persons module 16, the extract DMP feature(s) module 18, and the video retrieval and path reconstruction module 1940. Storage device 1926 may also store computer-readable computer-executable instructions for implementing the search engine module 20, which may include attribute based searching 1936 and instance-based searching. Storage device 1926 may also store computer-readable computer-executable instructions for implementing a graphical user interface 24.

The computing device 1900 may include a network interface 1912 configured to interface via one or more network devices 1922 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1912 may include a built-in network adapter, network interface card, PCMCIA network card, card bus network adapter, wireless network adapter, USB network adapter, modem or any other device suitable for interfacing the computing device 1900 to any type of network capable of communication and performing the operations described herein. The network device 1922 may include one or more suitable devices for receiving and transmitting communications over the network including, but not limited to, one or more receivers, one or more transmitters, one or more transceivers, one or more antennae, and the like. Video data may be obtained via the network device 1922.

The computing device 1900 may run any operating system 1916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1916 may be run in native mode or emulated mode. In an exemplary embodiment, the operating system 1916 may be run on one or more cloud machine instances.

IX. Exemplary Network Environments

Figure 20:
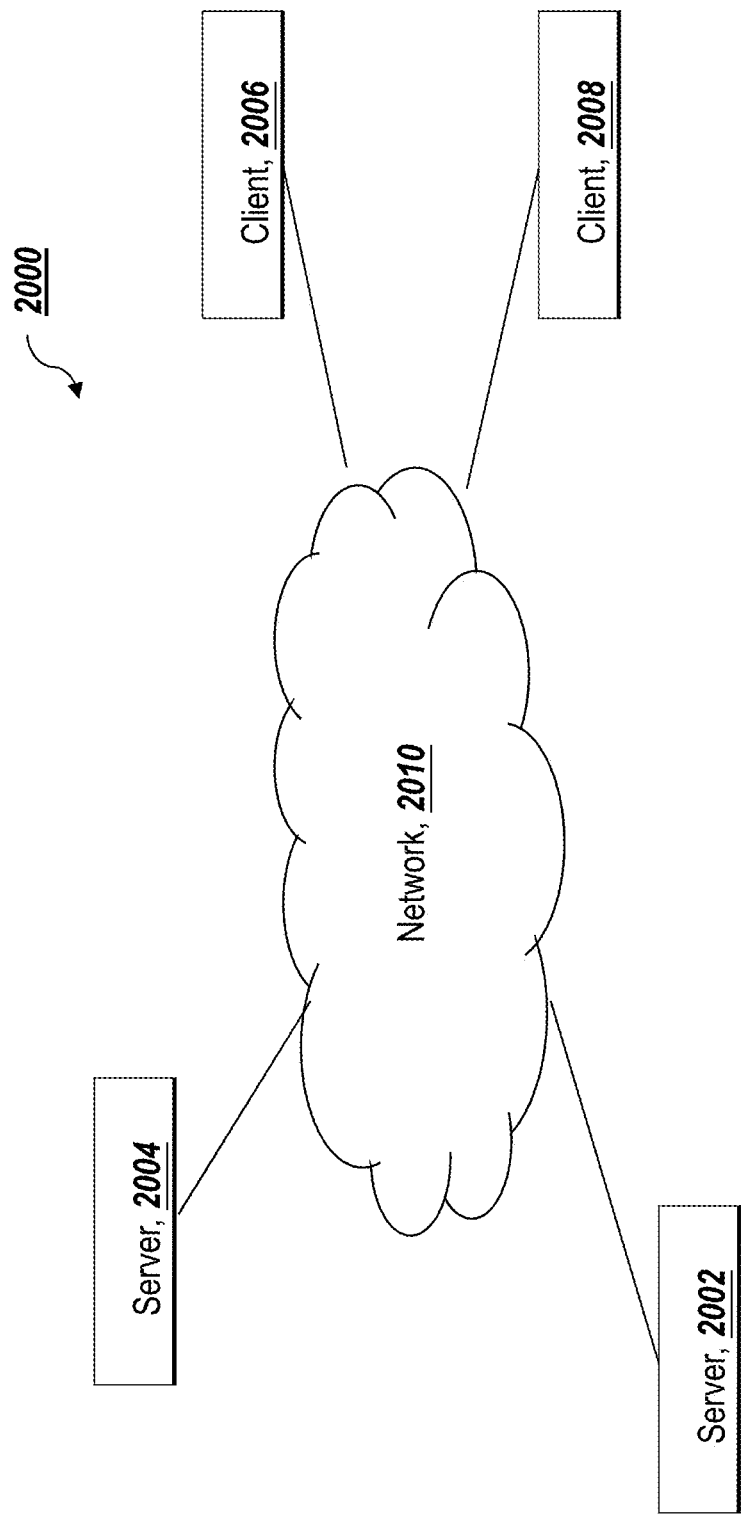
FIG. 20 depicts an exemplary network environment suitable for a distributed implementation of the embodiments taught herein.

FIG. 20 is a diagram of an exemplary network environment 2000 suitable for a distributed implementation of exemplary embodiments. The network environment 2000 may include one or more servers 2002 and 2004 coupled to one or more clients 2006 and 2008 via a communication network 2010. The network interface 1912 and the network device 1922 of the computing device 1900 enable the servers 2002 and 2004 to communicate with the clients 2006 and 2008 via the communication network 2010. The communication network 2010 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 2010 are capable of supporting distributed implementations of exemplary embodiments.

In an exemplary embodiment, the servers 2002 and 2004 may provide the clients 2006 and 2008 with computer-readable and/or computer-executable components, products, or services under a particular condition, such as a license agreement. The computer-readable and/or computer-executable components or products may include those for providing and rendering an exemplary graphical user interface for video surveillance of video data obtained locally or accessed via a network. The clients 2006 and 2008 may provide and render an exemplary graphical user interface using the computer-readable and/or computer-executable components, products and/or services provided by the servers 2002 and 2004. In an exemplary embodiment, the clients 2006 and 2008 may transmit information regarding a search operation performed by a user using the user interface to the servers 2002 and 2004 that may, in turn, automatically update the user interface based on the search operation.

Alternatively, in another exemplary embodiment, the clients 2006 and 2008 may provide the servers 2002 and 2004 with computer-readable and computer-executable components, products and/or services under a particular condition, such as a license agreement. The computer-readable and/or computer-executable components or products may include those for providing and rendering an exemplary graphical user interface for video surveillance. The servers 2002 and 2004 may provide and render an exemplary graphical user interface using the computer-readable and/or computer-executable components, products and/or services by the clients 2006 and 2008. In an exemplary embodiment, the servers 2002 and 2004 may transmit information on search operation performed by a user using the user interface to the clients 2006 and 2008 that may, in turn, automatically update the user interface based on the search operation.

X. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention. Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed:

1. A computer implemented method for analyzing video data including a plurality of people, the method comprising:
   receiving an identification of a person of interest in an image;
   detecting one or more moving persons in a frame for each frame in a plurality of frames of comparison video data, wherein the plurality of frames of comparison video data does not include an image of the person of interest;
   creating a record including image data from a subsection of the frame associated with the detected moving person for each of the detected moving persons and for each of the plurality of frames of comparison video data;
   creating a person-specific detector for the person of interest by training a support vector machine classifier using at least one image of the person of interest as positive training data and the records of the detected moving persons in plurality of frames of comparison video data as negative training data; and
   applying the person-specific detector to a plurality of records from video data of interest to identify one or more records as candidate matches to the person of interest.

2. The computer-implemented method of claim 1, further comprising:
   detecting one or more moving persons in a frame for each in a plurality of frames of the video data of interest; and
   creating a record including image data from a subsection of the frame associated with the detected moving person for each detected moving person in the plurality of frames of the video of interest.

3. The computer-implemented method of claim 1, wherein receiving an identification of a person of interest in an image comprises receiving an identification of one or more records in one or more frames of the video of interest.

4. The computer-implemented method of claim 1, wherein the support vector machine classifier compares information regarding full-body or nearly full-body images to obtain the person-specific detector.

5. The computer-implemented method of claim 1, wherein the person-specific detector incorporates information about non-facial features of a person.

6. The computer-implemented method of claim 1, further comprising:
   displaying the one or more one or more candidate match records to a user; and
   receiving a selection of at least one of the one or more candidate match records from the user.

7. The computer implemented method of claim 6, further comprising estimating a spatial path between the selected candidate match records based on time information and on location information associated with each of the selected candidate match records.

8. The computer implemented method of claim 7, further comprising storing the estimated spatial path and the selected candidate match records.

9. The computer-implemented method of claim 6, further comprising creating a composite video including a plurality of video segments with images of the person of interest.

10. The computer-implemented method of claim 9, wherein the plurality of video segments are obtained from a plurality of cameras.

11. The computer-implemented method of claim 9, wherein the composite video is based on the reconstructed path.

12. A non-transitory computer-readable medium encoded with computer-executable instruction for performing a method comprising:
    receiving an identification of a person of interest in an image;
    detecting one or more moving persons in a frame for each frame in a plurality of frames of comparison video data, wherein the plurality of frames of comparison video data does not include an image of the person of interest;
    creating a record including image data from a subsection of the frame associated with the detected moving person for each of the detected moving persons and for each of the plurality of frames of comparison video data;
    creating a person-specific detector for the person of interest by training a support vector machine classifier using at least one image of the person of interest as positive training data and the records of the detected moving persons in plurality of frames of comparison video data as negative training data; and
    applying the person-specific detector to a plurality of records from video data of interest to identify one or more records as candidate matches to the person of interest.

13. The non-transitory computer-readable medium of claim 12, wherein the method further comprises:
    detecting one or more moving persons in a frame for each in a plurality of frames of the video data of interest; and
    creating a record including image data from a subsection of the frame associated with the detected moving person for each detected moving person in the plurality of frames of the video of interest.

14. The non-transitory computer-readable medium of claim 12, wherein receiving an identification of a person of interest in an image comprises receiving an identification of one or more records in one or more frames of the video of interest.

15. The non-transitory computer-readable medium of claim 12, wherein the support vector machine classifier compares full-body or nearly full-body images to obtain the person-specific detector.

16. The non-transitory computer-readable medium of claim 12, wherein the person-specific detector incorporates information about non-facial features of a person.

17. The non-transitory computer-readable medium of claim 12, wherein the method further comprises:
    displaying the one or more one or more candidate match records to a user; and
    receiving a selection of at least one of the one or more candidate match records from the user.

18. The non-transitory computer-readable medium of claim 17, wherein the method further comprises estimating a spatial path between the selected candidate match records based on time information and on location information associated with each of the selected candidate match records.

19. The non-transitory computer-readable medium of claim 18, wherein the method further comprises storing the estimated spatial path and the selected candidate match records.

20. The non-transitory computer-readable medium of claim 18, wherein the method further comprises creating a composite video including a plurality of video segments with images of the person of interest.

21. The non-transitory computer-readable medium of claim 20, wherein the plurality of video segments are obtained from a plurality of cameras.

22. The computer-implemented method of claim 20, wherein the composite video is based on the reconstructed path.

23. A system for video surveillance, the system comprising:
- a graphical user interface for receiving search criteria from a user and displaying search results to a user;
- a processor for executing computer-executable instructions; and
- a storage for storing records including images of detected moving persons in video data, for storing features extracted from the records and for storing computer-executable code, the computer-executable code comprising computer executable instructions for:
  - a module that detects one or moving persons in a plurality of frames of input video data and saves a record including image information for each detected moving person in each frame;
  - a module that extracts features for each record, wherein the features include features of a non-head portion of a person; and
- a module that receives a user input regarding a person of interest and calculates a match score for a record based on a comparison of the user input regarding the person of interest and the extracted features for the record, the module that calculates a match score including an instance-based search module that:
  - creates a person-specific detector for the person of interest by training a support vector machine classifier using image data of the person of interest as positive training data and the records of detected moving persons in comparison video data that does not include the person of interest as negative training data; and
  - applies the person-specific detector to records from video data of interest to calculates an instance-based match score

* * * * *